US011285603B2

(12) United States Patent
Yamada et al.

(10) Patent No.: US 11,285,603 B2
(45) Date of Patent: Mar. 29, 2022

(54) INFORMATION PROCESSING APPARATUS, CONTROL METHOD, ROBOT SYSTEM, AND STORAGE MEDIUM

(71) Applicant: CANON KABUSHIKI KAISHA, Tokyo (JP)

(72) Inventors: Daisuke Yamada, Kawasaki (JP); Masahiro Suzuki, Kawasaki (JP); Tomoaki Higo, Kawasaki (JP); Yuichiro Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 16/386,140

(22) Filed: Apr. 16, 2019

(65) Prior Publication Data

US 2019/0329409 A1 Oct. 31, 2019

(30) Foreign Application Priority Data

Apr. 27, 2018 (JP) .............................. JP2018-087447

(51) Int. Cl.
  *B25J 9/16* (2006.01)
(52) U.S. Cl.
  CPC ............ *B25J 9/1664* (2013.01); *B25J 9/163* (2013.01); *B25J 9/1612* (2013.01); *B25J 9/1661* (2013.01); *B25J 9/1669* (2013.01)
(58) Field of Classification Search
  CPC combination set(s) only.
  See application file for complete search history.

(56) References Cited

U.S. PATENT DOCUMENTS

| 9,669,543 | B1* | 6/2017 | Stubbs | ................ H05K 999/99 |
| 2004/0249509 | A1* | 12/2004 | Rogers | ............... G05B 19/4103 |
| | | | | 700/245 |
| 2008/0253612 | A1* | 10/2008 | Reyier | .................. B25J 9/1697 |
| | | | | 382/103 |
| 2017/0114553 | A1* | 4/2017 | Raman | ................ E04F 21/1872 |
| 2020/0198130 | A1* | 6/2020 | Goldberg | ........... G06K 9/00208 |

FOREIGN PATENT DOCUMENTS

JP 2017-30135 A 2/2017

* cited by examiner

*Primary Examiner* — Jeff A Burke
*Assistant Examiner* — Arslan Azhar
(74) *Attorney, Agent, or Firm* — Canon U.S.A., Inc. IP Division

(57) ABSTRACT

The information processing apparatus includes an estimation unit to estimate information indicating a holding success possibility from an image of a plurality of the target objects by using a pre-trained model that estimates the information indicating the holding success possibility in at least one or more partial regions, a determination unit to determine a holding region for the robot to hold the target object among the partial regions based on the information indicating the holding success possibility, and a control unit to move the robot based on the holding region and cause the robot to perform a holding operation on the target object. In a case where the holding operation performed on the target object by the robot is failed, the determination unit determines a partial region, among the partial regions, satisfying a predetermined condition as a next holding region based on the information indicating the holding success possibility.

22 Claims, 16 Drawing Sheets

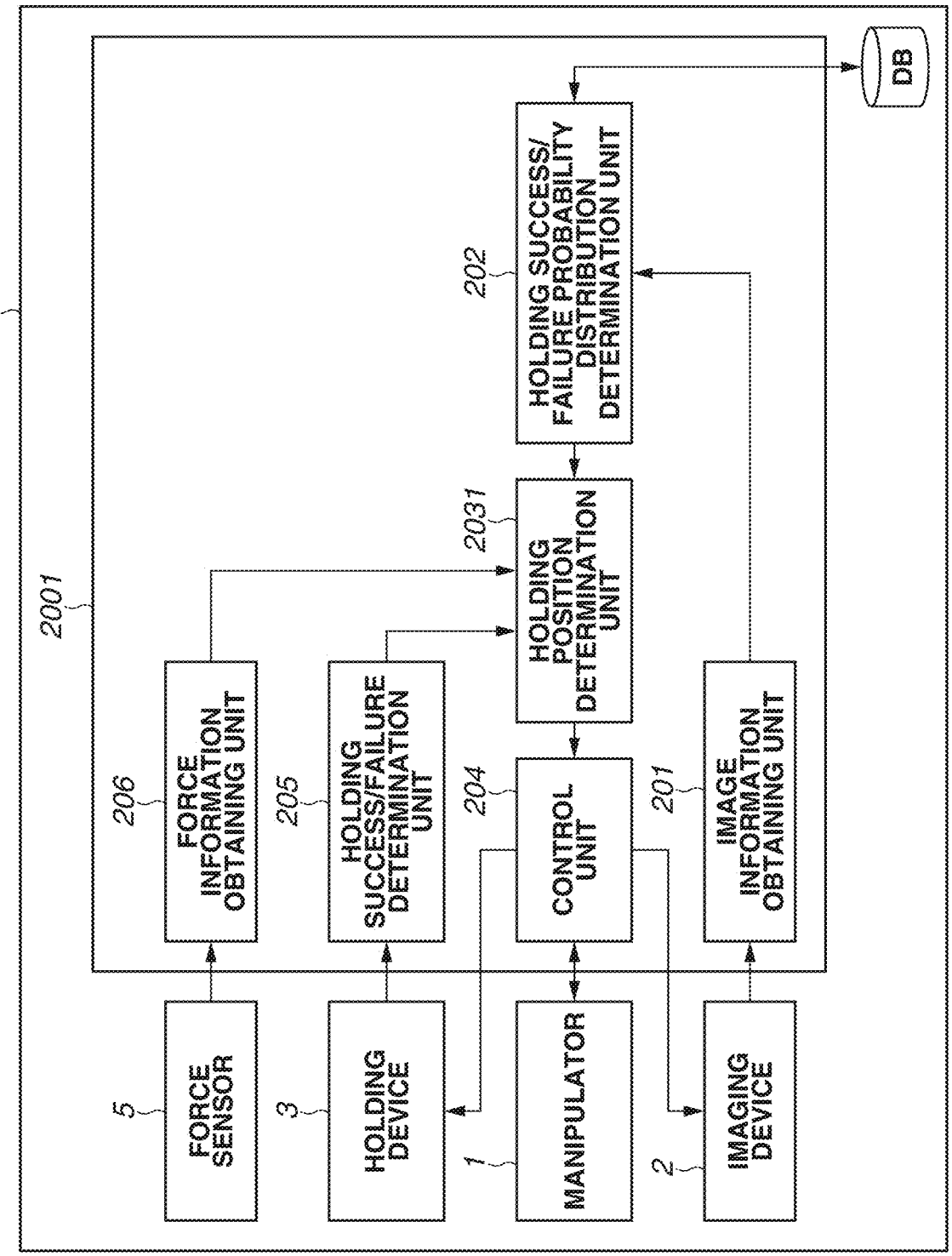

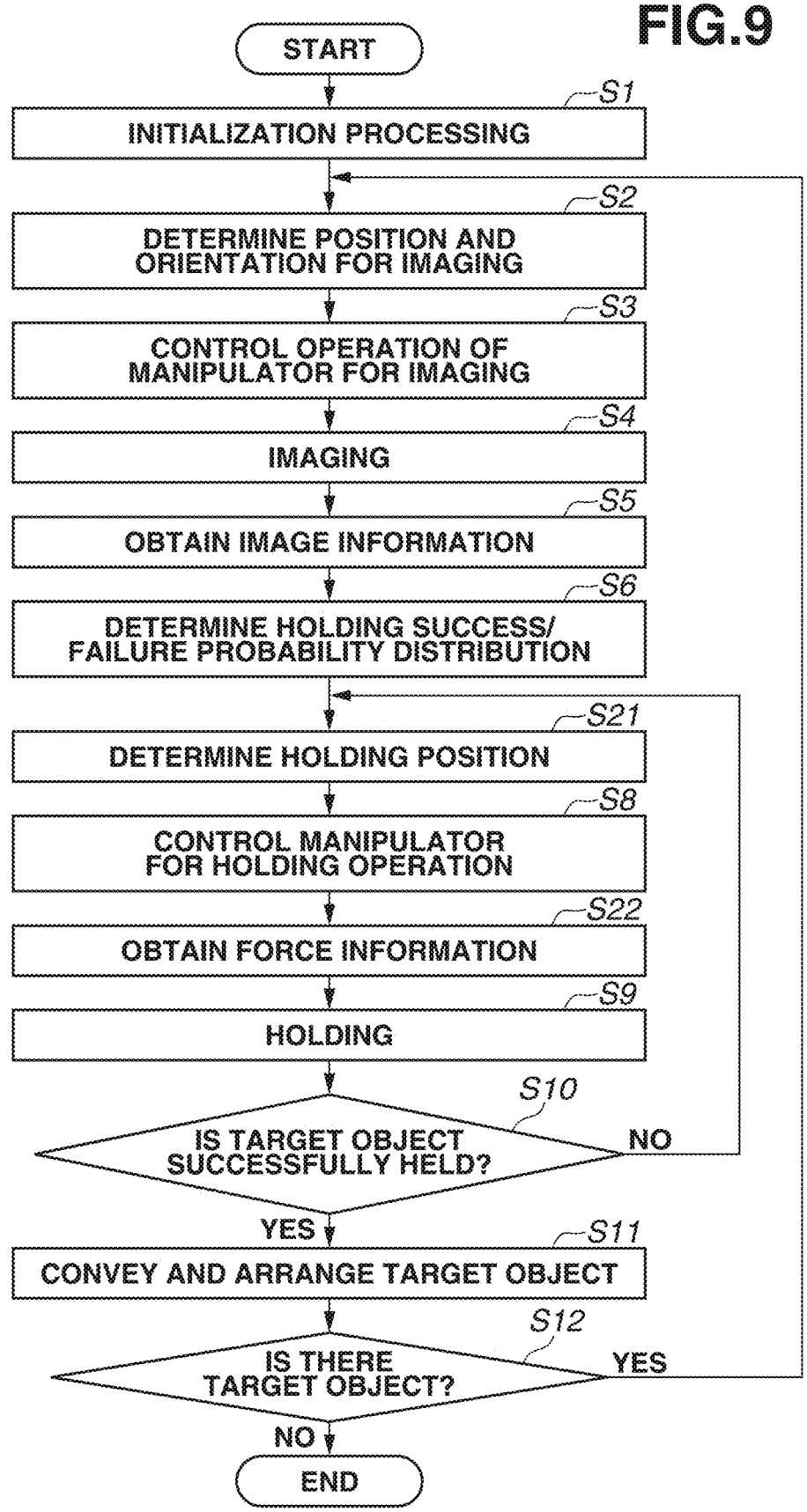

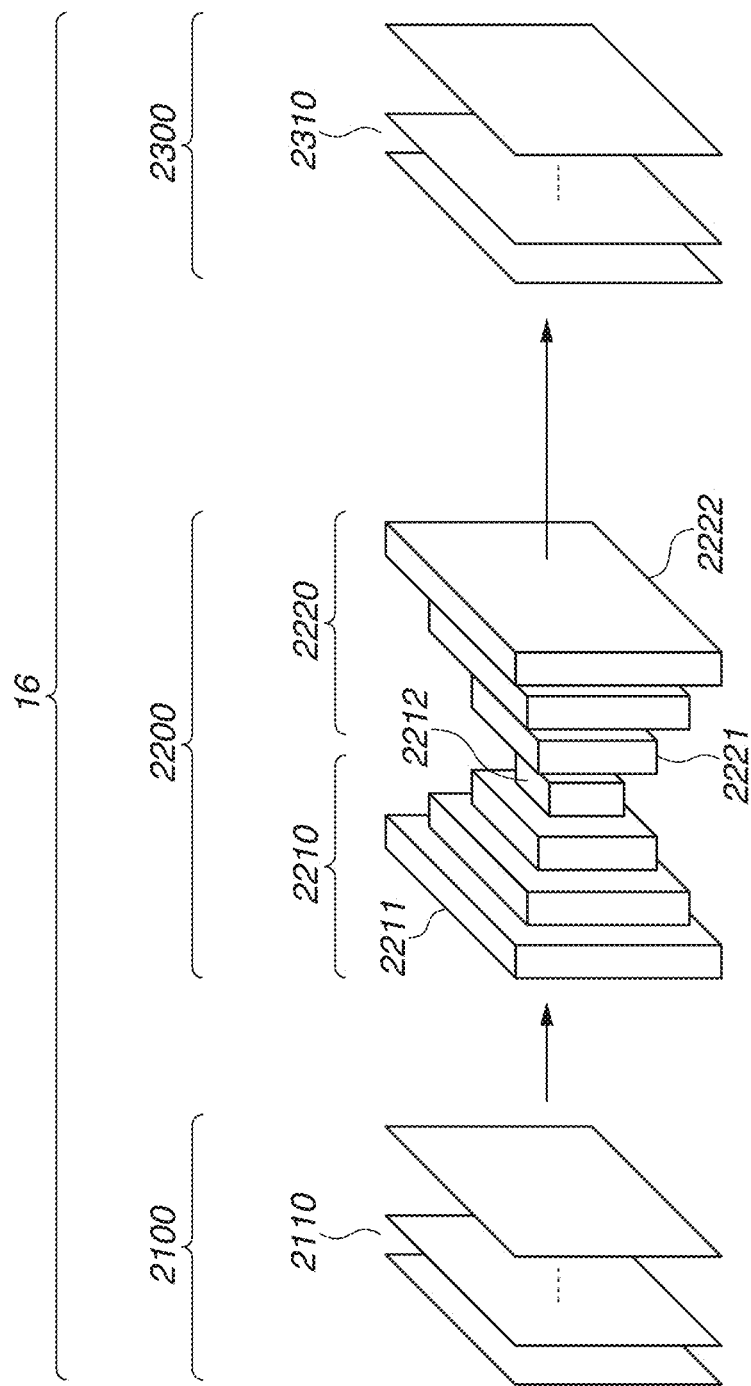

INFORMATION PROCESSING APPARATUS, CONTROL METHOD, ROBOT SYSTEM, AND STORAGE MEDIUM

BACKGROUND

Field

The present disclosure relates to a technique for controlling a robot that manipulates a target object to be manipulated.

Description of the Related Art

In holding a target object by using a robot including a holding device, such as an arm, an information processing apparatus, such as a computer that controls operation of the robot estimates a holding position for the target object based on image information obtained through three-dimensionally measurement of the target object. The information processing apparatus generates a computer-aided design (CAD) model for the target object from, for example, the image information, and estimates the holding position. Estimating the holding position enables the robot to hold, for example, one of target objects disorderly stacked in bulk. Japanese Patent Application Laid-Open No. 2017-30135 discusses a robot system using a machine learning apparatus that estimates a holding position for a target object without generating a CAD model. The machine learning apparatus estimates the holding position without CAD model data by learning case data ranging from recognition to holding, including image information and holding execution results, by using deep learning. The machine learning apparatus enables the robot to hold one of target objects stacked in bulk based on the estimation result.

Failure of the holding device to hold a target object causes a drop in work efficiency. If the target objects stacked in bulk are wrapped in plastic bags or cushioning material, a change in light reflection on the target object and surface shape makes it difficult for the information processing apparatus to accurately estimate a holding position. Since the holding position is difficult to be accurately estimated, the probability of the robot failing in holding a target object increases. The robot then may need to repeat the holding operation a plurality of times. In such a case, a method for holding target objects in the descending order of the positions of the target objects in terms of height or a method for performing a three-dimensional measurement again can be used, but work efficiency is low.

SUMMARY

The present disclosure is mainly directed to providing an information processing apparatus that can improve work efficiency by performing the holding of a target object using the robot in a shorter time.

According to an aspect of the present disclosure, an information processing apparatus for controlling operation of a robot to hold and move a target object includes, an estimation unit to estimate information indicating a holding success possibility from an image of a plurality of the target objects by using a pre-trained model that estimates the information indicating the holding success possibility in at least one or more partial regions, a determination unit to determine a holding region for the robot to hold the target object among the at least one or more partial regions based on the information indicating the holding success possibility, and a control unit to move the robot based on the holding region and cause the robot to perform a holding operation on the target object, wherein the determination unit, in a case where the holding operation performed on the target object by the robot is failed, determines a partial region, among the at least one or more partial regions, satisfying a predetermined condition as a next holding region based on the information indicating the holding success possibility.

Further features will become apparent from the following description of exemplary embodiments with reference to the attached drawings.

BRIEF DESCRIPTION OF THE DRAWINGS

FIG. 8 is a functional explanatory diagram of an information processing apparatus.

FIG. 9 is a flowchart illustrating processing for controlling a robot system.

FIG. 16 is a diagram illustrating a learning model.

DESCRIPTION OF THE EMBODIMENTS

Exemplary embodiments will be described in detail below with reference to the accompanying drawings.

Figure 1:
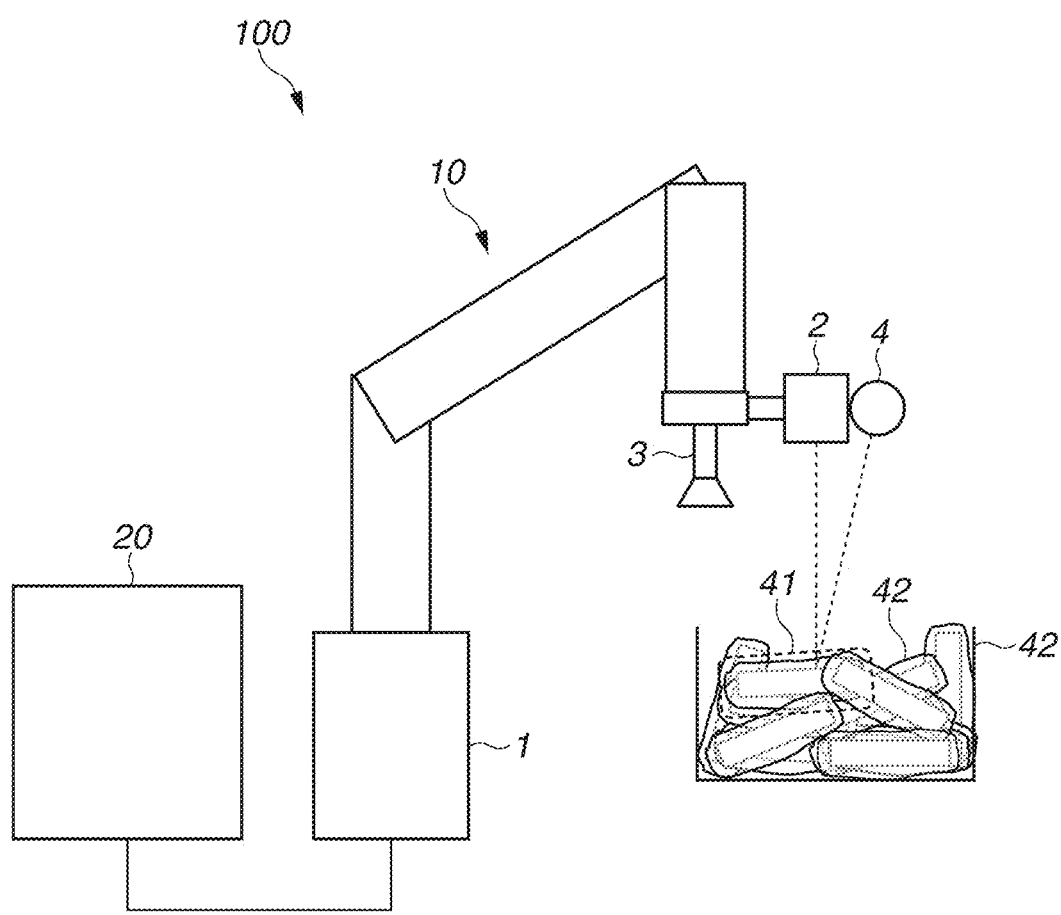
FIG. 1 is an exemplary configuration diagram of a robot system.

A first exemplary embodiment will be described below. FIG. 1 is an exemplary configuration diagram of a robot system including an information processing apparatus according to the present exemplary embodiment. FIG. 1 illustrates an example of a device configuration and is not intended to limit the range of application of the present disclosure. A robot system 100 includes a robot 10 and an information processing apparatus 20.

The robot 10 is an articulated robot, for example. The robot 10 includes a manipulator 1, such as a robot arm, and a holding device 3, such as a robot hand. The robot 10 includes a position and orientation changing mechanism with which the position and orientation of the holding device 3 can be changed by the angles of joints of the manipulator 1 being changed. The position and orientation changing mechanism includes, as a driving unit, an electric motor or an actuator operating with fluid pressure, such as hydraulic pressure and air pressure. The position and orientation changing mechanism is driven under the control of the information processing apparatus 20.

The holding device 3 is a tool for implementing manipulation performed by the robot 10 based on the type of target object to be manipulated. The holding device 3 can hold a target object by using a hand that includes a chuck mechanism capable of motor driving and can grip the target object, or a hand that uses a suction pad for holding the target object with air pressure. Herein, "hold" means to grip or suction the target object, and to bring the target object into a conveyable state. The holding device 3 is detachably attached to the manipulator 1, and can be replaced based on the type of target object. The robot 10 is not limited to an articulated robot but may be a movable machine that can be controlled through numerical control (NC).

The robot 10 executes an action under the control of the information processing apparatus 20, and performs manipulation, such as conveyance and holding of a target object 41. In the present exemplary embodiment, an "action" refers to an operation of the robot 10 for recognizing or manipulating the target object 41. The target object 41 is a part to be held and conveyed by the robot 10. An example of the target object 41 is a cable wrapped in a plastic bag. The target object 41 is an object to be held among a group of a plurality of disorderly arranged objects. As illustrated in FIG. 1, target objects are stacked in a container in a disorderly manner. The irregular arrangement makes a holding position difficult to set in advance. As illustrated in FIG. 1, the target object 41 is covered with wrapping or packaging material. If the wrapping or packaging material is made of soft substances and freely deformable in surface shape, the accuracy of an image recognition technique using, e.g., template matching can drop. In the present exemplary embodiment, even an object wrapped in wrapping material can be stably held by a region appropriate for holding among the group of target objects being estimated using neural network deep learning. The target object 41 for the robot 10 to hold changes depending on a change in the holding position or the holding target. There are surrounding objects 42 around the target object 41. The surrounding objects 42 refer to all objects lying around the target object 41, other than the target object 41. Examples of the surrounding objects 42 include the same type of objects stacked in bulk around the target object 41 as the target object 41, the container or box containing the target object 41, and objects around the container or box.

The robot system 100 further includes an imaging device 2 and a light source 4. The imaging device 2 is a camera or a visual sensor including a light-detecting sensor or a photodiode. The imaging device 2 generates, for example, image information as visual information about the target object 41 and the surrounding objects 42. Examples of the "image information" include two-dimensional color image information and distance image information. The imaging device 2 transmits the obtained image information to the information processing apparatus 20. The light source 4 includes a projector, for example. The light source 4 emits visible light or infrared rays to project uniform illumination light or patterned light on the target object 41 and the surrounding objects 42. The imaging device 2 captures an image of the target object 41 and the surrounding objects 42 on which the light is projected by the light source 4. The imaging device 2 can also capture an image of the target object 41 and the surrounding objects 42 with light not being projected by the light source 4. Among methods for capturing a distance image are a light coding method, a time-of-flight (ToF) method, and a method of obtaining distance information from stereo camera-based parallax information by using the principle of triangulation. The light coding method is a method of reading an infrared pattern projected from the light source 4 by using the imaging device 2, and obtaining distance information by the principle of triangulation. The ToF method is a method of obtaining distance information from time in which a projected infrared pulse is reflected and returned.

The imaging device 2 and the light source 4 may be fixedly arranged above the space to be imaged or mounted on another working machine, instead of being mounted on the robot 10 as illustrated in FIG. 1. A plurality of imaging devices 2 may be provided.

Figure 2:
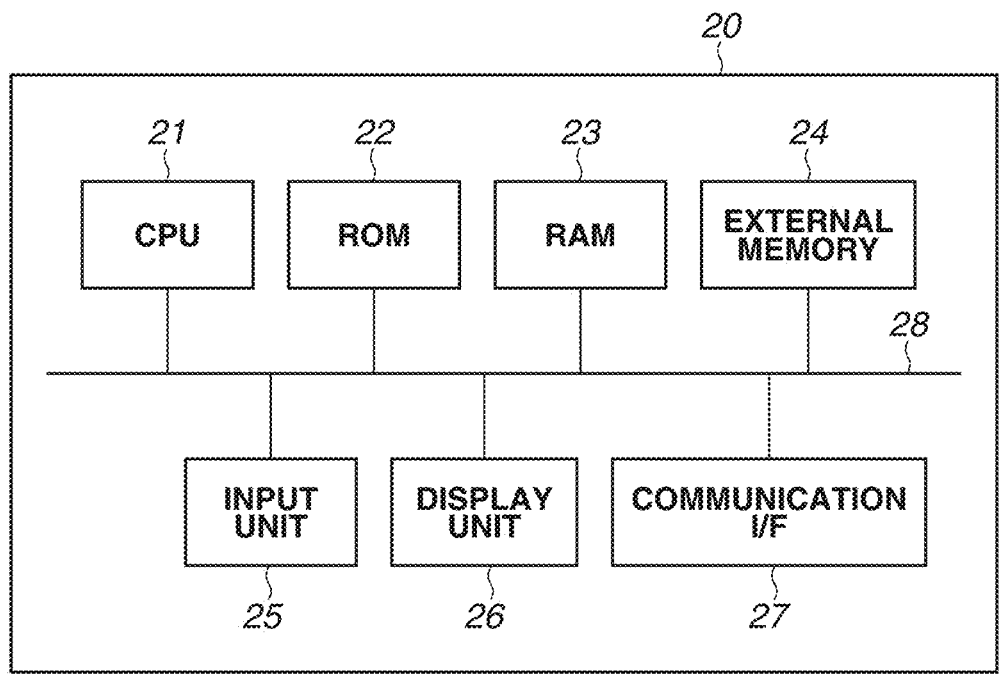
FIG. 2 is a hardware configuration diagram of an information processing apparatus.

FIG. 2 is a hardware configuration diagram of the information processing apparatus 20. The information processing apparatus 20 is a robot control apparatus for controlling the operation of the robot 10. For example, the information processing apparatus 20 is implemented by a personal computer. The information processing apparatus 20 includes a central processing unit (CPU) 21, a read-only memory (ROM) 22, and a random access memory (RAM) 23. The information processing apparatus 20 further includes an external memory 24, an input unit 25, a display unit 26, a communication interface (I/F) 27, and a system bus 28.

The CPU 21 controls operation of the robot system 100 by executing a computer program stored in at least either one of the ROM 22 and the external memory 24, using the RAM 23 as a working area. For example, the external memory 24 stores various types of data and various types of information needed when the CPU 21 performs processing. The external memory 24 also stores various types of data and various types of information obtained by the CPU 21 performing processing. The input unit 25 includes, for example, a keyboard, a pointing device, such as a mouse, and a touch panel. The operator can input instructions to the information processing apparatus 20 via the input unit 25. The display unit 26 includes a monitor, such as a liquid crystal display. The communication I/F 27 is an I/F for communicating with an external apparatus. A system bus 28 connects the CPU 21, the ROM 22, the RAM 23, the external memory 24, the input unit 25, the display unit 26, and the communication IF 27 in a communicable manner. The information processing apparatus 20 having such a configuration controls operation of an external apparatus, such as the robot 10, via the communication I/F 27.

In the present exemplary embodiment, the information processing apparatus 20 generates a holding success/failure probability distribution for the target object 41 at each position based on the visual information (image information) about the target object 41 obtained from the imaging device 2 that is a visual sensor. The information processing apparatus 20 determines a holding position based on the holding success/failure probability distribution, and executes a holding operation with the robot 10 based on the determined holding position. The information processing apparatus 20 here makes a success/failure determination on the execution result of the holding operation (holding execution result). If the target object 41 fails to be held, the information processing apparatus 20 repeats processing for determining a holding position different from the previous one based on the holding success/failure probability distribution and executing the holding operation again. The robot system 100 can thereby succeed in holding the target object 41 in fewer attempts and can thus improve work efficiency.

In the present exemplary embodiment, as described above, the target object 41 is an object to be held by the robot 10. Examples of the target object 41 include an object that changes in light reflection thereon or shape thereof, like a cable wrapped in a plastic bag or cushioning material. The "holding success/failure probability distribution" is a distribution indicating the probability of successful holding at each position. The holding success/failure probability distribution is determined by using a learning model generated based on visual information and/or any one or more of holding success/failure determination results of the robot 10.

In a case where the learning model is generated based on visual information, for example, the information processing apparatus 20 trains the learning model with a true value given by a person to a position where the target object 41 is likely to be successfully held on an image as a predicted holding success position. Here, the input is the image information, and the output is the position on the image. In a case where the learning model is generated based on the holding success/failure determination result(s) of the robot 10, for example, the information processing apparatus 20 recognizes the target object 41 through image processing. The information processing apparatus 20 gives a true value to each position in the recognized image based on the result of an attempt to check whether the robot 10 can hold the target object 41. The information processing apparatus 20 then trains the learning model with the position as a holding success position or holding failure position. Here, the input is the image-processed data, and the output is the estimation result whether the holding succeeds or fails on the data. In a case where the learning model is generated based on visual information and a success or failure of holding by the robot 10, the information processing apparatus 20 trains the learning model with, for example, a result indicating whether the robot 10 can hold the target object 41, with an image as the input. Here, the input is the image information, and the output is the estimation result whether the holding succeeds or fails at a position determined from the image information. A holding position refers to a position to hold the target object 41. For example, a holding position refers to a suction position for a suction mechanism mounted as the holding device 3.

Figure 3:
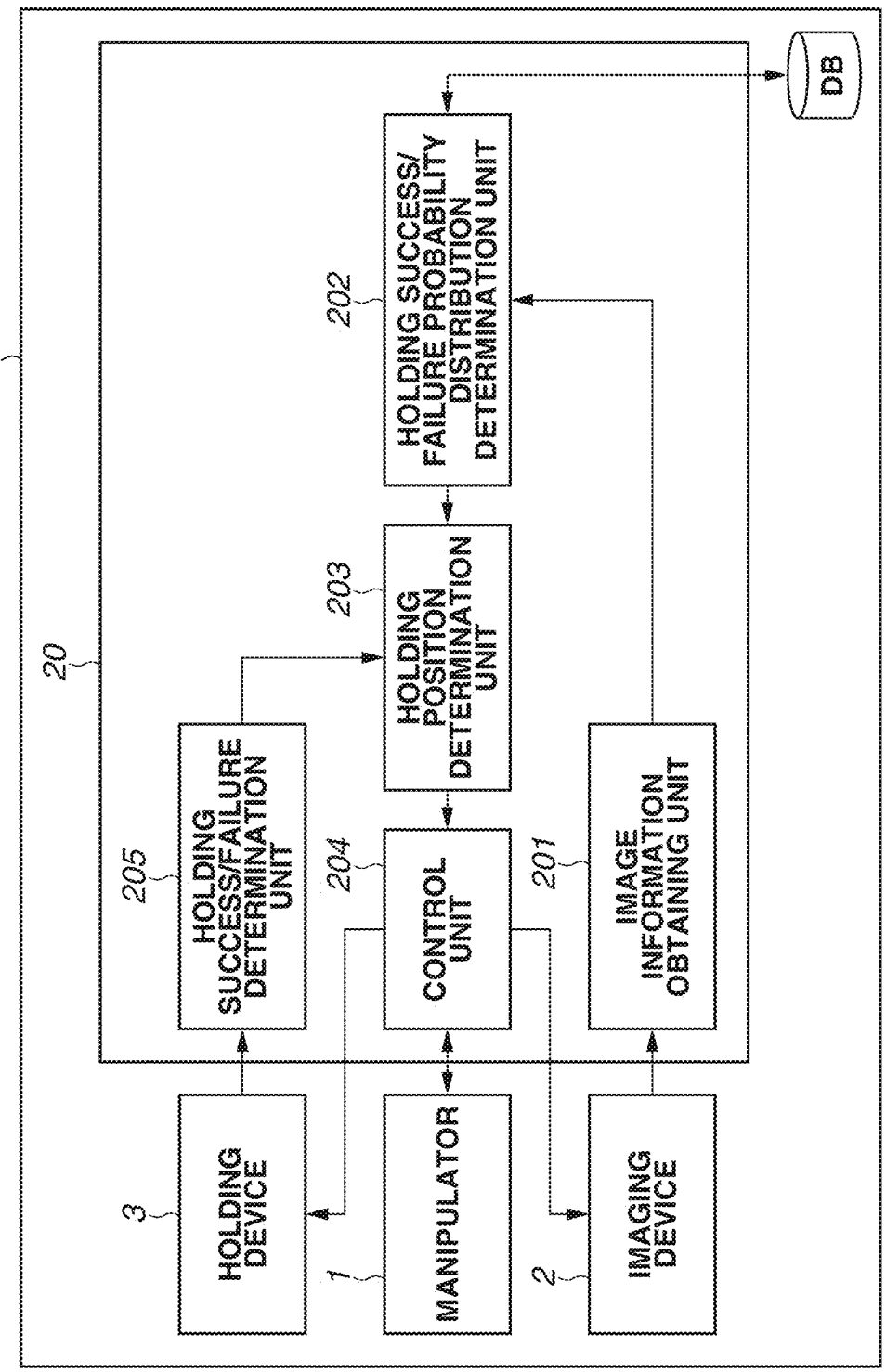
FIG. 3 is a functional explanatory diagram of the information processing apparatus.

FIG. 3 is a functional exemplary diagram of the information processing apparatus 20 for implementing such operations. The information processing apparatus 20 functions as an image information obtaining unit 201, a holding success/failure probability distribution determination unit 202, a holding position determination unit 203, a control unit 204, and a holding success/failure determination unit 205. Such functions can be implemented by the CPU 21 executing a computer program. Alternatively, at least part of the functions may be implemented by hardware.

The image information obtaining unit 201 obtains image information as visual information from the imaging device 2. The image information obtaining unit 201 transmits the obtained image information to the holding success/failure probability distribution determination unit 202. The image information obtaining unit 201 includes, for example, a capture board and a memory.

The holding success/failure probability distribution determination unit 202 determines a holding success/failure probability distribution, which is a distribution of probabilities of success or failure for the robot 10 to hold the target object 41 at each position in the image, based on the image information obtained from the image information obtaining unit 201. The holding success/failure probability distribution determination unit 202 transmits the determined holding success/failure probability distribution to the holding position determination unit 203. In generating the holding success/failure probability distribution, the holding success/failure probability distribution determination unit 202 may perform estimation, for example, by using a convolutional neural network (CNN) as a learning model. The CNN is an example of a deep learning model. In such a case, the holding success/failure probability distribution determination unit 202 refers to a database DB as appropriate. The holding success/failure probability distribution determination unit 202 determines the holding success/failure probability distribution by using a model stored in the database DB. The holding success/failure probability distribution includes probability values expressed by, for example, numerical values in the range of 0 to 1. The higher the numerical value, the higher the probability of successful holding.

Now, a configuration example of the CNN will be described with reference to FIG. 16. A network structure 16 represents a CNN that is a type of deep neural network. The network structure 16 configured by the CNN includes an input layer 2100. The input layer 2100 includes an image input section 2110 for inputting an input image. For example, in the case of inputting a color image, the input image includes red green blue (RGB) color information or luminance of each pixel. In the case of inputting a distance image, the input image includes distance information about each pixel. A convolutional layer 2200 is a CNN that includes a convolutional layer 2210 including at least one layer, a deconvolutional layer 2220 including at least one layer, and a fully connected layer (not illustrated) including at least one layer. Such CNN layers include at least one or more elements each. The internal layers of the convolutional layer 2210 are connected in order by convolution. A final layer 2212 of the convolutional layer 2210 is connected with a lowermost layer 2221 of the deconvolutional layer 2220 by deconvolution. The internal layers of the deconvolutional layer 2220 are connected in order by deconvolution. All the elements of the final layer 2212 of the convolutional layer 2210 are fully connected to all the elements of the lowermost layer of the fully connected layer. The fully connected layer includes a plurality of layers, which are connected in order by full connection. The connections between the layers are given respective connection weights. The connection weights are CNN parameters and read from the DB when the model is read. The CNN parameters are updated during training. Initial values of the parameters may be given at random during training. Alternatively, the CNN may be previously trained with values given based on a rule. In the present exemplary embodiment, during training, images to which true values are given by a person are used as training data. Details will be described below. The image input section 2110 is connected with a lowermost layer 2211 of the convolutional layer 2210 by convolution.

An output layer 2230 includes an output section 2310. The output section 2310 outputs an output signal (holding success/failure probability distribution) in a map form corresponding to the size of the input image. Each map of the output section 2310 is connected with a final layer 2222 of the deconvolutional layer 2220 by deconvolution. The holding success/failure probability distribution at each position (or region) on the image is output to the output section 2310.

The holding position determination unit 203 determines a holding position or a holding position and orientation of the manipulator 1 for the holding operation to be performed by the holding device 3. The holding position determination unit 203 may determine not only the holding position or the holding position and orientation but also a trajectory to the holding position. The holding position or the holding position and orientation is/are determined based on the holding success/failure probability distribution determined by the holding success/failure probability distribution determination unit 202. The holding position determination unit 203 transmits the determined holding position or holding position and orientation to the control unit 204.

The control unit 204 controls operation of the manipulator 1, the imaging device 2, and the holding device 3. During imaging, the control unit 204 controls the position and orientation of the manipulator 1 so that the imaging device 2 captures an image of the target object 41 and the surrounding objects 42. After the movement of the imaging device 2, the control unit 204 transmits an imaging trigger signal to the imaging device 2. The imaging device 2 performs an imaging operation in response to the imaging trigger. The control unit 204 also performs light emission control on the light source 4 as appropriate in synchronization with the imaging. In holding the target object 41, the control unit 204 regulates the manipulator 1 to a holding position and orientation so that the holding device 3 holds the target object 41. After the movement of the holding device 3, the control unit 204 transmits a holding trigger to the holding device 3. The holding device 3 performs a holding operation in response to the holding trigger.

When the holding device 3 performs a holding operation on the target object 41, the holding success/failure determination unit 205 determines whether the holding device 3 succeeds or fails in holding the target object 41. For example, in a case where the holding device 3 is a suction mechanism, the holding success/failure determination unit 205 makes the determination by measuring the degree of vacuum reached during suction. Specifically, the holding success/failure determination unit 205 previously sets a threshold of the reached degree of vacuum for determining that suction succeeds. The holding success/failure determination unit 205 measures the degree of vacuum reached during execution of the suction operation. If the measurement result reaches the threshold, the holding success/failure determination unit 205 determines that the target object 41 is successfully sucked and the suction is successful (holding succeeds). If the measurement result does not reach the threshold, the holding success/failure determination unit 205 determines that the target object 41 is not successfully sucked and the suction is failed (holding fails).

Figure 4:
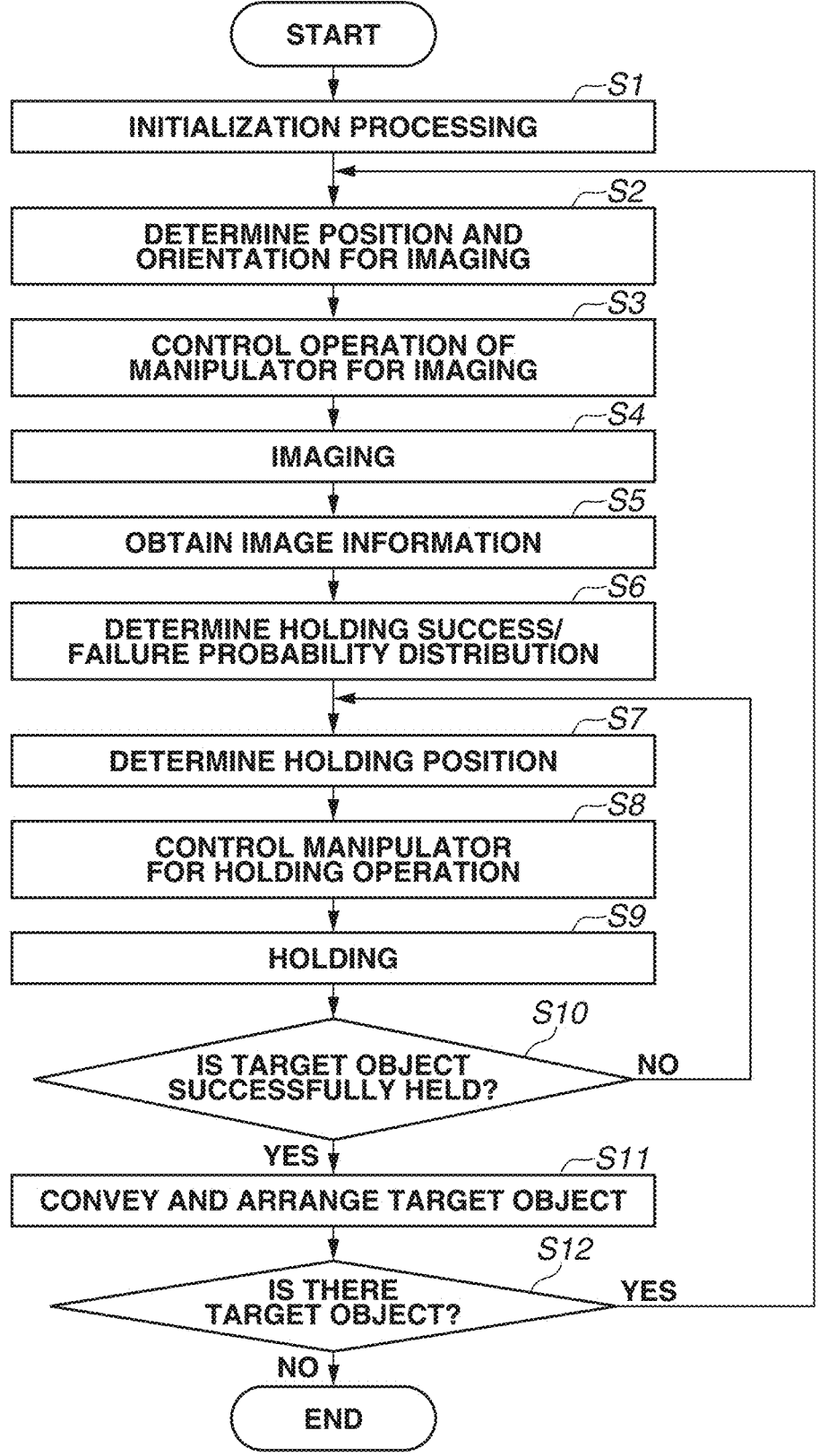
FIG. 4 is a flowchart illustrating processing for controlling the robot system.

FIG. 4 is a flowchart illustrating processing for controlling the robot system 100, which is to be performed by the information processing apparatus 20 having the foregoing configuration. The processing is started, for example, when the operator activates the robot system 100. However, the start timing is not limited to when the robot system 100 is activated.

In step S1, the CPU 21 starts processing and initially performs initialization processing of the robot system 100. In the initialization processing, the CPU 21 loads the computer program stored in either the ROM 22 or the external memory 24 into the RAM 23 and brings the computer program into an executable state. The CPU 21 reads parameters of the devices connected to the information processing apparatus 20 and restores the devices to initial positions, thereby bringing the devices into a usable initial state.

In step S2, the control unit 204 obtains a position and orientation to move the manipulator 1 to for the sake of imaging by the imaging device 2. The position and orientation are determined, for example, by the CPU 21 functioning as an imaging position and orientation determination unit. The position and orientation may be determined by any method as long as the imaging device 2 can capture an image of the target object 41 and the surrounding objects 42 at the determined position and orientation. For example, the position and orientation may be determined by random numbers. The designer may determine a position and orientation of fixed values in advance. The designer may determine a range, and the position and orientation may be determined by random numbers within the range.

In step S3, the control unit 204 controls operation of the manipulator 1 to perform imaging. Specifically, the control unit 204 determines how to move the manipulator 1 to the position and orientation obtained in the processing of step S2. For example, the control unit 204 converts information about the aiming position and orientation into joint angle information about the manipulator 1 using forward kinematics to move the manipulator 1 to the position and orientation obtained in the processing of step S2. The control unit 204 calculates command values for operating the actuators of the respective joints of the manipulator 1 based on the joint angle information. The control unit 204 operates the manipulator 1 based on the command values.

In step S4, the control unit 204 controls operation of the imaging device 2 for imaging. The imaging device 2 captures an image of the target object 41 and the surrounding objects 42 under the control of the control unit 204. Here, the control unit 204 performs light emission control on the light source 4 as appropriate. In step S5, the image information obtaining unit 201 obtains image information about the target object 41 and the surrounding objects 42 from the imaging device 2. The image information obtaining unit 201 transmits the obtained image information to the holding success/failure probability distribution determination unit 202.

In step S6, the holding success/failure probability distribution determination unit 202 determines a probability distribution of successes and failures in holding the target object 41 at each position based on the image information obtained from the image information obtaining unit 201. The holding success/failure probability distribution determination unit 202 transmits the determined holding success/failure probability distribution to the holding position determination unit 203. The image information obtained from the imaging device 2 is information about a two-dimensional color image and a distance image. The probability distribution is determined, for example, by using results of estimation obtained with deep learning. Specifically, if the holding device 3 is a suction pad, a person gives a two-dimensional color image of cables stacked in bulk a true value about at which position in the image the target object 41 can be held by suction via the input unit 25.

A "true value" refers to correct answer data in training. In the present exemplary embodiment, a true value in an image input to the CNN that is a type of deep learning model refers to a position in the image to be learned with success of the holding at the position. A true value can be given, for example, by a person specifying a position onscreen on an image displayed on the display unit 26 by using the input unit 25, which is a pointing device, such as a mouse. One or a plurality of true values is given to a plurality of images of different bulk-stacking states. The holding success/failure probability distribution determination unit 202 clips an image of appropriate size (for example, an RGB image of 128×128 pixels) to be a pixel of interest vicinity image out of the obtained image, with a pixel specified by the input unit 25 as a pixel of interest. The holding success/failure probability distribution determination unit 202 accumulates training data for the clipped pixel of interest vicinity image by using the given true value(s) as a correct answer label(s). The holding success/failure probability distribution determination unit 202 generates a learning model, for example, by CNN training using the accumulated training data.

By using the generated learning model, the holding success/failure probability distribution determination unit 202 estimates holding success/failure probabilities through deep learning with the color image as the input. An example of the estimation method will be described below. Suppose that the range of existence of the target object 41 in the color image is known. For example, if the target object 41 is put in a box, the holding success/failure probability distribution determination unit 202 sets a region of interest (ROI) such that only the interior of the box is included in an estimation range. After the setting of the ROI, the holding success/failure probability distribution determination unit 202 clips images through a sliding window technique in such a manner that the entire ROI is scanned. Here, the holding success/failure probability distribution determination unit 202 sets a predetermined pixel in the color image as an estimation position, and clips an image of appropriate size (for example, 128× 128 pixels) around the estimation position as an estimation pixel vicinity image from the color image.

The holding success/failure probability distribution determination unit 202 inputs the estimation pixel vicinity images to the CNN and estimates a holding success/failure probability for each of the estimation pixel vicinity images. The holding success/failure probability is given to the center pixel of the sliding window that is an estimation pixel. The holding success/failure probability distribution determination unit 202 estimates holding success/failure probabilities on the assumption that the holding fails at positions outside the ROI. The ROI does not necessarily need to be set, and the holding success/failure probability distribution determination unit 202 may make estimations for the entire color image. In determining the holding success/failure probabilities, the holding success/failure probability distribution determination unit 202 does not necessarily need to make estimations pixel by pixel. The holding success/failure probability distribution determination unit 202 may make estimations by using a sliding window technique with an appropriate stride being set in consideration of a tradeoff with the calculation time.

Figure 5A:
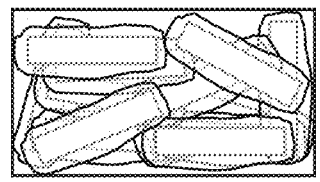
FIGS. 5A, 5B, and 5C are explanatory diagrams of a holding success/failure probability distribution.
Figure 5B:
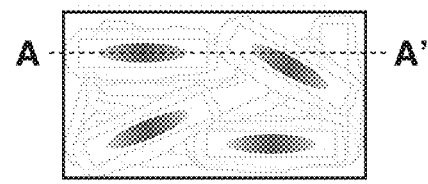
Figure 5C:
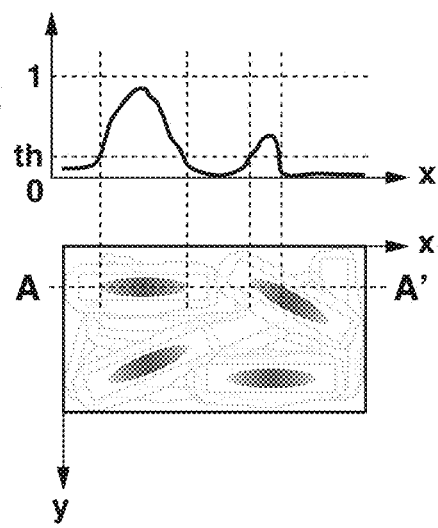

The holding success/failure probability distribution determination unit 202 determines a holding success/failure probability distribution for the two-dimensional color image by using the holding success/failure probabilities thus determined for the estimation pixel vicinity images. The determined holding success/failure probability distribution has, for example, continuous values of 0 to 1 for respective pixels of the two-dimensional color image. FIGS. 5A to 5C are explanatory diagrams illustrating a holding success/failure probability distribution determined from a two-dimensional color image. FIG. 5A is a diagram illustrating a two-dimensional color image of the target object 41 and the surrounding objects 42 captured by the imaging device 2 when the robot 10 and the target object 41 have the relative positional relationship illustrated in FIG. 1. FIG. 5B illustrates an image obtained by superimposing a holding success/failure probability distribution determined from the two-dimensional color image of FIG. 5A on the two-dimensional color image of FIG. 5A. In FIG. 5B, the darker the color of a portion is, the higher the estimated probability of succeeding in holding at the position is. A threshold th is set for the holding success/failure probabilities, and positions below the threshold th are illustrated in a specific color depth. FIG. 5C is a diagram illustrating the height of the holding success/failure probability distribution as seen in section A-A' of FIG. 5B. The presence of a plurality of dark portions in FIGS. 5B and 5C means that there is a plurality of candidates for the target object 41 to be held.

While a method that uses deep learning for recognition processing has been described, deep learning may be used for other than the recognition processing. For example, deep learning may be used for processing from recognition to holding. Specifically, suppose that a suction pad is used as the holding device 3. The holding position determination unit 203 determines a holding position indicating which position the robot 10 performs holding in a two-dimensional color image of cables stacked in bulk for pre-training, with the two-dimensional color image as the input. The holding position here may be determined through image processing or by using a random number. The designer may specify a range in advance, and the holding position may be determined by using a random number within the range.

After the determination of the holding position, the control unit 204 moves the robot 10 to the holding position and causes the robot 10 to execute a holding operation. After the execution of the holding operation, the holding success/failure probability distribution determination unit 202 attaches a holding success/failure label to the pixel of interest vicinity image, which is a part of the input two-dimensional color image, based on the result whether the holding succeeds, with the holding position as the pixel of interest. If a suction pad is used for the holding device 3, the holding success/failure label may be attached to pixels within a range corresponding to the diameter of the suction pad on the input two-dimensional color image. The range of labeling may be adjusted as appropriate. Through such a method, the holding success/failure probability distribution determination unit 202 accumulates training data and generates a learning model.

Using the generated learning model, the holding success/failure probability distribution determination unit 202 estimates holding success/failure probabilities using deep learning with a two-dimensional color image as the input. In the method in which the recognition processing is learned using deep learning, the input is a two-dimensional color image and the output is an estimation result about a true value that is given by a person as a likely value for successful holding. If the processing from recognition to holding is learned, the output is an estimation result in actually performing holding by the robot 10 while the input is the same two-dimensional color image. During estimation, a ROI may be set and a sliding window technique may be used as with the method in which the recognition processing is learned by using deep learning. If a two-dimensional color image is input, a holding success/failure probability distribution in performing holding by the robot 10 is determined.

Deep learning may be used for only the holding processing. Specifically, the recognition processing is performed through image processing, and the robot 10 performs a holding operation with the processed image information as the input. Examples of the image information include a predetermined size of image information cropped out of a two-dimensional color image, and a pixel of interest vicinity image. When the robot 10 performs the holding operation, a holding success/failure label is attached to the input image information based on the result whether the holding is successful. With such a method, the holding success/failure probability distribution determination unit 202 may accumulate training data and generate a learning model. In such a method, the input for deep learning is, for example, an image on which the recognition processing is performed. The output is, for example, an estimation result in actually performing holding by the robot 10. During estimation, a ROI may be set, or a sliding window technique may be used as with the method in which the recognition processing or the recognition and holding processing is learned by using deep learning. If an image on which the recognition processing is performed is input, a position for the robot 10 to perform holding is estimated. The holding success/failure probability distribution is determined by using the estimation result.

While the holding success/failure probability distribution is here determined mainly by using a two-dimensional color image, a distance image may be used instead of the two-dimensional color image. Alternatively, both a two-dimensional color image and a distance image may be used.

In step S7, the holding position determination unit 203 determines a holding position for a first attempt based on the holding success/failure probability distribution determined by the holding success/failure probability distribution determination unit 202 in step S6. The holding position determination unit 203 determines, for example, a position at which the probability of succeeding in holding is the highest in the holding success/failure probability distribution as the holding position for the first attempt. As illustrated in FIGS. 5A to 5C, the holding success/failure probability distribution is determined based on the two-dimensional color image. The coordinates of the position determined from the holding success/failure probability distribution therefore correspond to the position of the same coordinates on the two-dimensional color image. After the determination of the holding position on the two-dimensional color image, the holding position determination unit 203 determines a position, on the distance image, corresponding to the holding position on the two-dimensional color image. The holding position determination unit 203 transmits information about the determined holding positions on the two-dimensional color image and the distance image to the control unit 204.

Examples of the trajectory of the robot 10 in approaching a holding position include one that minimizes the distance to the holding position, one that maximizes the moving speed of the robot 10, or one based on the holding success/failure probability distribution. A trajectory based on the holding success/failure probability distribution refers, for example, to the trajectory of an approach operation covering a region where the holding success/failure probabilities are high. Specifically, the holding position determination unit 203 initially sets a certain threshold for the holding success/failure probability distribution. The holding position determination unit 203 then determines a position at which the holding success/failure probability is the highest in a region where the holding success/failure probabilities exceed the threshold as the holding position for the first attempt. The holding success/failure probability being high means that the probability is higher than a predetermined value and the holding is estimated to be likely to succeed. If the holding success/failure probabilities in a range having a radius of r around the determined holding position are higher than the threshold, the holding position determination unit 203 determines that the probability of succeeding in holding is high within the range. In making an approach operation to the holding position, the robot 10 then moves along a circular spiral trajectory or random trajectory within the range of the radius r or to cover the range. The robot 10 can thereby move to cover the region where the holding success/failure probabilities are high around the holding position as a holding target range by one approach operation.

In step S8, the control unit 204 controls the manipulator 1 for a holding operation. Specifically, the control unit 204 determines how to move the manipulator 1 based on the holding position, the holding position and orientation, or the trajectory determined by the holding position determination unit 203. Since the holding position determined by the holding position determination unit 203 is a position in an image, the control unit 204 needs to convert the position into a position in a robot coordinate system to control the manipulator 1.

Figure 6:
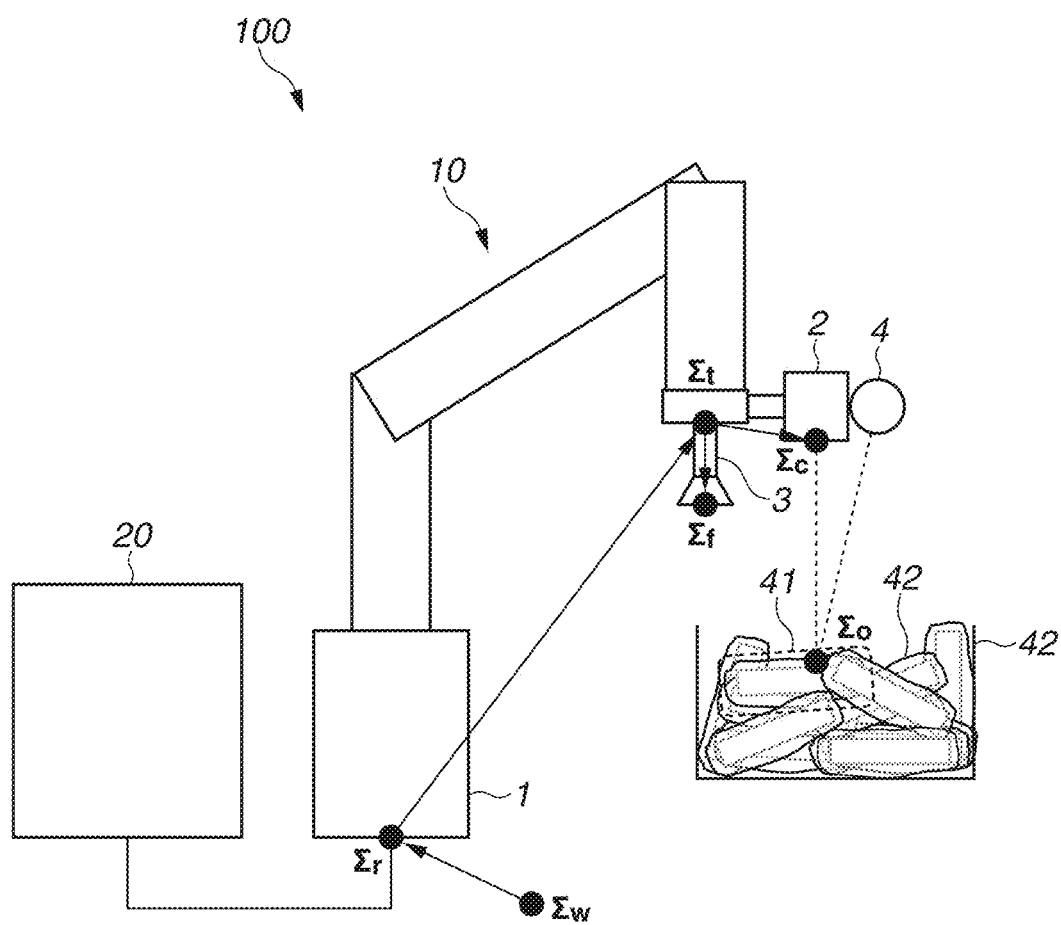
FIG. 6 is an explanatory diagram of coordinate systems.

FIG. 6 is an explanatory diagram of coordinate systems. A coordinate system (imaging device coordinate system) $\Sigma c$ of the imaging device 2, a coordinate system (manipulator coordinate system) $\Sigma r$ of the manipulator 1, an end coordinate system (manipulator end coordinate system) $\Sigma t$ of the manipulator 1, a coordinate system $\Sigma f$ of the holding device 3, and a coordinate system (target object coordinate system) $\Sigma o$ of the target object 41 are handled in an integrated manner. For that purpose, as illustrated in FIG. 6, a world coordinate system $\Sigma w$ is set as a coordinate system serving as a reference in the working space.

A displacement from the world coordinate system $\Sigma w$ to the manipulator coordinate system $\Sigma r$ is denoted by (RX, RY, RZ). The orientation of the manipulator 1 is expressed by a 3×3 rotation matrix RM. A displacement from the manipulator coordinate system $\Sigma r$ to the manipulator end coordinate system $\Sigma t$ is denoted by (TX, TY, TZ). The orientation of the manipulator end is expressed by a 3×3 rotation matrix TM. A displacement from the manipulator end coordinate system $\Sigma t$ to the coordinate system $\Sigma f$ of the holding device 3 is denoted by (FX, FY, FZ). The orientation of the end of the holding device 3 is expressed by a 3×3 rotation matrix FM. The end of the holding device 3 refers to a portion where the holding device 3 is brought into contact with the target object 41 or a surrounding object 42. A displacement from the manipulator end coordinate system $\Sigma t$ to the imaging device coordinate system $\Sigma c$ is denoted by (CX, CY, CZ). The orientation of the imaging device 2 is expressed by a 3×3 rotation matrix CM. A displacement from the imaging device coordinate system $\Sigma c$ to the target object coordinate system $\Sigma o$ of the target object 41 is denoted by (OX, OY, OZ). The orientation of the target object 41 is expressed by a 3×3 rotation matrix OM. A displacement of the target object 41 as seen from the world coordinate system $\Sigma w$ is denoted by (WX, WY, WZ). The orientation of the target object 41 is expressed by a 3×3 rotation matrix WM.

A displacement from the manipulator coordinate system $\Sigma r$ to the manipulator end coordinate system $\Sigma t$ when the holding device 3 attached to the end of the manipulator 1 is in contact with the target object 41 is denoted by (TX1, TY1, TZ1). The orientation of the manipulator end here is expressed by a 3×3 rotation matrix TM1. In such a case, the following equation holds:

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & TX1 \\ & TM1 & & TY1 \\ & & & TZ1 \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \quad \text{Eq. 1}$$

$W = R \cdot T_1 \cdot F.$

A displacement from the manipulator coordinate $\Sigma r$ to the manipulator end coordinate system $\Sigma t$ when the imaging device 2 captures an image of the target object 41 is denoted by (TX2, TY2, TZ2). The orientation of the manipulator end here is expressed by a 3×3 rotation matrix TM2. In such a case, the following equation holds:

$$\begin{pmatrix} & WX \\ WM & WY \\ & WZ \\ 0 \ 0 \ 0 & 1 \end{pmatrix} = \begin{pmatrix} & RX \\ RM & RY \\ & RZ \\ 0 \ 0 \ 0 & 1 \end{pmatrix} \cdot \begin{pmatrix} & TX2 \\ TM2 & TY2 \\ & TZ2 \\ 0 \ 0 \ 0 & 1 \end{pmatrix} \cdot \quad \text{Eq. 2}$$

$$\begin{pmatrix} & CX \\ CM & CY \\ & CZ \\ 0 \ 0 \ 0 & 1 \end{pmatrix} \cdot \begin{pmatrix} & OX \\ OM & OY \\ & OZ \\ 0 \ 0 \ 0 & 1 \end{pmatrix}$$

$$W = R \cdot T_2 \cdot C \cdot O.$$

The foregoing two equations express the position and orientation of the target object 41 in the world coordinate system $\Sigma w$. The following equations therefore hold:

$$R \cdot T_1 \cdot F = R \cdot T_2 \cdot C \cdot O, \text{ and}$$

$$T_1 = T_2 \cdot C \cdot O \cdot F^{-1}. \quad \text{Eqs. 3}$$

From the equations, the control unit 204 calculates the position and orientation of the manipulator 1 in holding the target object 41. Here, the position and orientation of the manipulator 1 during imaging, a relationship between the manipulator end coordinate system $\Sigma t$ and the imaging device coordinate system $\Sigma c$, a relationship between the imaging device coordinate system $\Sigma c$ and the position and orientation of the target object 41, and a relationship between the manipulator end coordinate system $\Sigma t$ and the position and orientation of the holding device 3 are known in advance. The control unit 204 can thus determine the position and orientation of the manipulator 1 in holding the target object 41 from the image of the target object 41 captured by the imaging device 2.

An example of a method for determining the displacements and the rotation matrixes will be described. The displacement (RX, RY, RZ) and the rotation matrix RM are determined from a positional relationship with the world coordinate system $\Sigma w$ that is set when the manipulator 1 is installed. The displacement (TX, TY, TZ) and the rotation matrix TM are determined from the joint angle information about the manipulator 1 using forward kinematics. The displacement (FX, FY, FZ) and the rotation matrix FM are determined from the dimensions of the holding device 3. The displacement (CX, CY, CZ) and the rotation matrix CM are determined from the dimensions of the imaging device 2. Alternatively, the displacement (CX, CY, CZ) and the rotation matrix CM are determined from a relative positional and orientational relationship between the imaging device 2 and the manipulator 1 by using calibration. For example, the displacement (CX, CY, CZ) and the rotation matrix CM are determined based on a relative positional relationship with the manipulator 1 determined by a known two-dimensional marker being imaged with the imaging device 2 in each of states in which the manipulator 1 takes a plurality of different positions and orientations. The displacement (OX, OY, OZ) and the rotation matrix OM are determined by an image of the target object 41 being captured with the imaging device 2. For example, in a case where the holding position determination unit 203 determines a holding position from a two-dimensional color image, the displacement (OX, OY, OZ) and the rotation matrix OM are determined by determination of a distance to the holding position from the coordinate values corresponding to the holding position in the distance image. While the world coordinate system $\Sigma w$ and the coordinate system $\Sigma r$ of the manipulator 1 have been discussed separately, the two coordinate systems may be considered to coincide.

In step S9, the control unit 204 controls the holding device 3 for a holding operation. Under the control of the control unit 204, the manipulator 1 moves to the holding position and orientation, and the holding device 3 performs a holding operation on the target object 41.

In step S10, the holding success/failure determination unit 205 determines whether the holding device 3 succeeds in holding the target object 41. For example, if the holding device 3 is a suction device, whether or not the holding is successful can be determined by evaluation of the degree of vacuum that the ejector (suction device) reaches during the suction operation. More specifically, the holding success/failure determination unit 205 previously sets a threshold for the reached degree of vacuum at which suction is determined to be successful, and measures the degree of vacuum reached during execution of a suction operation. If the measurement result reaches the threshold, the holding success/failure determination unit 205 determines that the suction is successful (holding succeeds). If the measurement result does not reach the threshold, the holding success/failure determination unit 205 determines that the suction is failed (holding fails). If the holding device 3 is a gripping apparatus, whether or not holding succeeds or fails can be determined by a gripping width being evaluated. Specifically, the holding success/failure determination unit 205 measures the gripping width of the holding device 3 during execution of the holding operation. If the measurement result matches the size of the target object 41, the holding success/failure determination unit 205 determines that the holding is successful. If the measurement result is too small or too large with respect to the size of the target object 41, the holding device 3 can be holding nothing, holding an object different from the target object 41, holding a plurality of objects, or holding the target object 41 in an unintended state. The holding success/failure determination unit 205 then determines that the holding is failed.

If the holding device 3 fails in holding the target object (NO in step S10), the processing proceeds to step S7. Here, the holding success/failure determination unit 205 transmits information indicating the holding failure to the holding position determination unit 203. In step S7, the holding position determination unit 203 having received the information determines a holding position different from the previous one based on the holding success/failure probability distribution. The processing of the holding position determination unit 203 in determining a holding position again will be described.

Figure 7A:
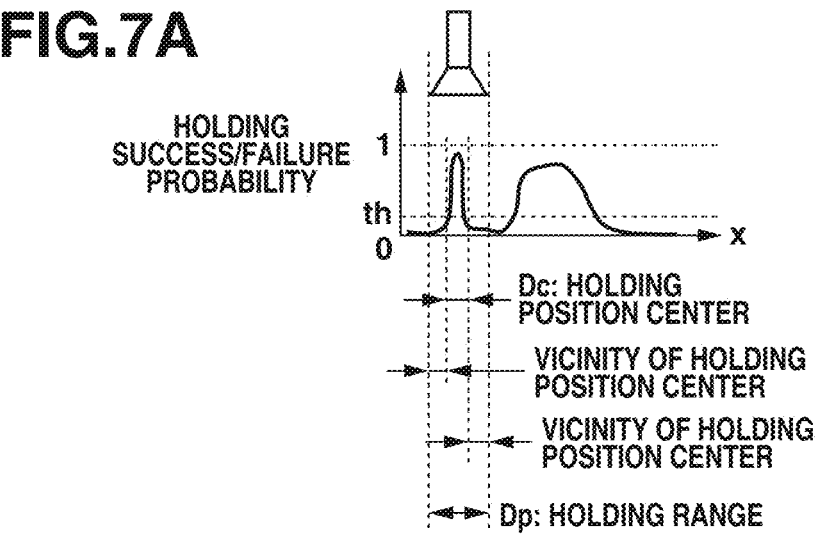
FIGS. 7A, 7B, and 7C are explanatory diagrams of a relationship between the holding success/failure probability distribution and a holding position.
Figure 7B:
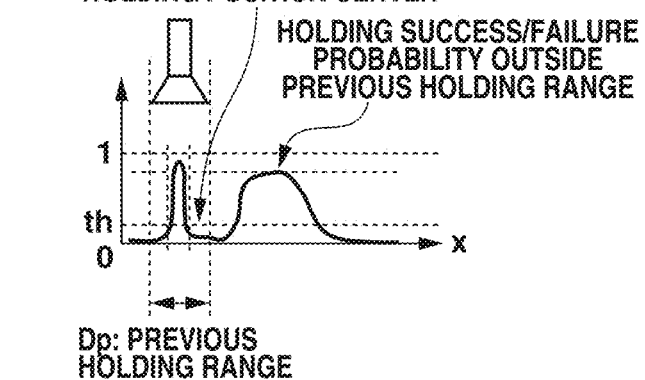
Figure 7C:
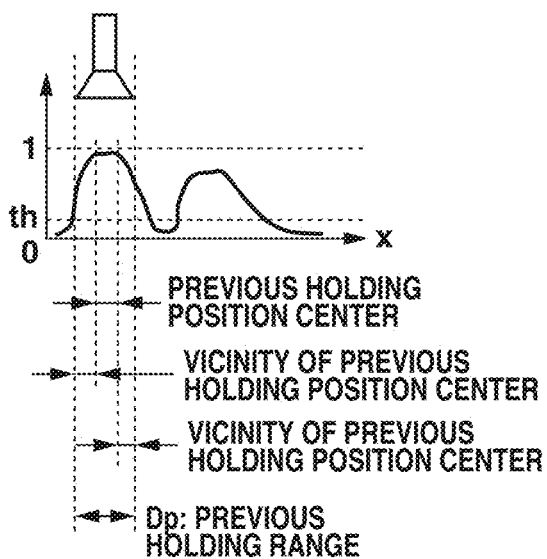

If the holding is determined to be failed, the holding position determination unit 203 determines a position different from the previous one(s) as the next holding position based on the holding success/failure probability distribution. For example, suppose that the previous holding position is such that the holding success/failure probability is high only at a holding position center and low in the vicinity of the holding position center. In such a case, holding is likely to fail if the holding is attempted in the vicinity of the holding position center. FIGS. 7A to 7C are explanatory diagrams illustrating a relationship between the holding success/failure probability distribution and the holding position.

FIG. 7A illustrates a relationship between the holding success/failure probability, the holding position center, the vicinity of the holding position center, and a holding range. If a suction pad is used for the holding device 3, the holding position center refers to a range Dc that is set within a diameter Dp of the suction pad. The vicinity of the holding position center refers to a range within the diameter Dp of the suction pad and outside the range Dc. The holding range refers to the interior of the range corresponding to the diameter Dp of the suction pad. The holding position center and the vicinity of the holding position center do not necessarily set with reference to the diameter Dp of the suction pad, and may be set freely. The sizes of the holding position center and the vicinity of the holding position center may be changed as appropriate. As illustrated in FIG. 7B, if the holding success/failure probability in the vicinity of the previous holding position center is lower than that outside the holding range, the holding position determination unit 203 determines the next holding position from outside the previous holding range. For example, the holding position determination unit 203 excludes the previous holding range from the holding success/failure probability distribution, and determines a position having the highest holding success/failure probability as the next holding position. As illustrated in FIG. 7C, if the holding success/failure probability distribution in the vicinity of the previous holding position center is higher than that outside the previous holding range, the holding is considered likely to succeed in the vicinity of the previous holding position center. In such a case, the holding position determination unit 203 determines the next holding position from a range within the vicinity of the previous holding position based on the holding success/failure probability distribution. That the holding success/failure probability distribution in the vicinity of the previous holding position center is high does not necessarily mean that the holding success/failure probability in the vicinity of the previous holding position center is higher than that outside the previous holding range. For example, a specific threshold may be provided for the holding success/failure probability, and the holding success/failure probability distribution in the vicinity of the previous holding position center may be determined to be high if the holding success/failure probability in the vicinity of the previous holding position center exceeds the threshold.

In the case of determining the next holding position from the vicinity of the previous holding position center, the holding position determination unit 203 determines the next holding position from among positions having high holding success/failure probabilities in the vicinity of the previous holding position center. For example, if there is an elliptical range of high holding success/failure probabilities including the previous holding position center, the holding position determination unit 203 determines the next holding position within the elliptical range. The holding position determination unit 203 may determine the next holding position from among the positions in the elliptical range based on the descending order of the holding success/failure probability, at random, or based on a set rule.

In determining the next holding position, image processing may be performed as well to update the holding success/failure probability distribution based on the range where there is no target object 41. For example, the next holding position is determined by also using a method for recognizing the range where there is no target object 41 by image processing. Specifically, if the target object 41 is put in a box, the holding success/failure probability distribution determination unit 202 determines the range where there is no target object 41 through image processing based on image information, and determines that the holding success/failure probabilities are "0". The range where there is no target object 41 can be determined, for example, from a differential image between a range where the box in the two-dimensional color image is visible and a captured image of the box alone. Alternatively, a range where there is no object closer than the box bottom in the distance image may be determined to be the range where there is no target object 41.

In determining the next holding position, the orientation of the holding device 3 may be changed. For example, when approaching the target object 41 for a holding operation, the holding device 3 may not only make an approach to the target object 41 vertically below as illustrated in FIG. 1, but with a change in the orientation of the robot 10 as well. More specifically, in a case where the holding position determination unit 203 determines the next holding position based on the holding success/failure probability distribution, the holding position determination unit 203 prepares a simplified model of the target object 41, and uses a result of model fitting in addition to the holding success/failure probability distribution. If the target object 41 is a deformable part, such as a cable wrapped in a plastic bag or cushioning material, accurate model fitting is difficult. However, since the simplified model can be prepared from approximate dimensions, the holding position determination unit 203 can roughly estimate the longitudinal direction of the target object 41 and estimate the center axis of the target object 41 from the two-dimensional color image and the distance image. If a suction pad is used for the holding device 3, the control unit 204 may perform control to cause the robot 10 to approach perpendicularly to the center axis, so that the holding device 3 can approach the target object 41 along the normal to the surface of the target object 41. The surface of the target object 41 and the surface of the suction pad can thus make contact without much gap. This reduces air leakage during suction, and the holding device 3 becomes more likely to succeed in holding the target object 41. In addition, the holding device 3 becomes less likely to perform holding between the target object 41 and a surrounding object 42 and less likely to hold the target object 41 and a surrounding object 42 together. The value to be determined by the holding position determination unit 203 here is not a holding position but a holding position and orientation.

If the holding device 3 succeeds in lifting up the target object 41 but fails to hold the target object 41, the distance between the holding device 3 and the target object 41 is determined to be insufficient. In such a case, the holding position determination unit 203 changes the position of the holding device 3 in the distance direction to further approach the target object 41 and sets the resultant as the next holding position without changing the position of the holding device 3 in planar directions with respect to the bottom of the box.

The holding success/failure determination processing of step S10 may be performed simultaneously with the processing of step S8. For example, in the processing of step S8, the manipulator 1 moves based on the holding position determined in the processing of step S7. If the holding device 3 is a suction device, the holding success/failure determination unit 205 constantly measures the reached degree of vacuum even during the movement. When the holding success/failure determination unit 205 determines that the suction (holding) is successful, the control unit 204 discontinues the moving operation of the manipulator 1 intended for holding and enters the next processing.

In step S10, if the target object 41 is successfully held (YES in step S10), the processing proceeds to step S11. Here, the holding success/failure determination unit 205 transmits information indicating the successful holding to the control unit 204. In step S11, the control unit 204 having received the information regulate the operation of the manipulator 1 to convey and arrange the target object 41. The control unit 204 may set conveyance via points and an arrangement position in advance. The control unit 204 may determine the conveyance via points and the arrangement position based on image information about a conveyance route and an arrangement location, obtained by the imaging device 2.

In step S12, after the conveyance and arrangement of the target object 41 ends, the CPU 21 determines whether there is a next target object 41. If there is no target object 41 (NO in step S12), the processing ends. If there is a target object 41 (YES in step S12), the processing proceeds to step S2. The CPU 21 repeats the processing of step S2 and the subsequent steps until there is no target object 41. For example, the number of times of processing may be set in advance, and the presence or absence of a target object 41 may be determined based on whether the number of times of successful holding reaches the number of times of processing. A sensor may be arranged at the point of supply of target objects 41, and the presence or absence of a target object 41 may be determined based on a detection result of the sensor. An example of the sensor is a weight sensor arranged at the point of supply of the target objects 41. The weight sensor measures the weight of the point of supply, whereby the remaining number of target objects 41 can be measured from the weight. The imaging device 2 may capture an image of the point of supply of the target objects 41, and the presence or absence of the target object 41 may be determined based on the obtained image information.

As described above, in the robot system 100 according to the present exemplary embodiment, the information processing apparatus 20 generates a holding success/failure probability distribution based on an image captured by the imaging device 2. The holding success/failure probability distribution determination unit 202 of the information processing apparatus 20 determines the holding success/failure probability distribution whether holding succeeds or fails from the image information. The holding position determination unit 203 of the information processing apparatus 20 determines a holding position for a target object 41 based on the determined holding success/failure probability distribution. The control unit 204 of the information processing apparatus 20 controls the operation of the robot 10 based on the determined holding position, and causes the robot 10 to perform an operation for holding the target object 41. The holding success/failure determination unit 205 of the information processing apparatus 20 determines whether the holding operation of the robot 10 succeeds or fails. If the holding operation is failed, the holding position determination unit 203 determines the next holding position different from the previous one(s) based on the holding success/failure probability distribution determined by the holding success/failure probability distribution determination unit 202. The information processing apparatus 20 repeatedly updates the holding position and causes the robot 10 to perform the holding operation until the target object 41 is held.

If the first holding attempt fails, the information processing apparatus 20 can determine positions where the probability of succeeding in holding is high as holding positions for the second and subsequent attempts by determining the holding positions based on the holding success/failure probability distribution. Such control eliminates the need to perform the entire processing from the imaging again in the event of a holding failure even if the target object 41 is one wrapped in a plastic bag or cushioning material, of which the position and orientation are difficult to be accurately recognized by the imaging device 2 and that the holding device 3 can fail to hold. Such control also eliminates the need for the holding device 3 to pick up target objects 41 in order from higher positions. The robot system 100 can thus hold a target object 41 in a short time, thus improving work efficiency.

The information processing apparatus 20 is not limited to two-dimensional color image information and can use distance image information or gray image information as the information for determining the holding success/failure probability distribution. The information processing apparatus 20 may determine the holding success/failure probability distribution based on information obtained from the visual sensor. In the case of using a distance image, the holding success/failure probability distribution determination unit 202 can obtain three-dimensional information and can thus determine a holding success/failure probability with respect to a position and orientation. The information processing apparatus 20 may store a history of holding positions where the target object 41 has failed to be held in the RAM 23, and prevent the holding positions from being determined as a new holding position for the target object 41 before the target object 41 changes in state. Examples of a change in the state of the target object 41 include successful holding, a predetermined number of times of acquisition of visual information (image information), and a change in position due to failed holding.

A second exemplary embodiment of the present disclosure will be described below. A robot system according to the present exemplary embodiment determines a holding position for a target object 41 by using a detection result of a detection device other than the visual sensor in combination with the robot system 100 according to the first exemplary embodiment. More specifically, as in the first exemplary embodiment, the robot system according to the second exemplary embodiment determines the holding success/failure probability distribution for the target object 41 based on visual information (image information) about the target object 41 imaged by the visual sensor. Next, the robot system determines a holding position based on the holding success/failure probability distribution, and executes a holding operation. Here, the robot system makes a success/failure determination on the holding execution result. If the holding is failed, the robot system determines a holding position different from the previous one based on the holding success/failure probability distribution and force information when the robot 10 makes contact with the target object 41. The force information indicates force or moment acting when the robot 10 makes contact with an object. The robot system then performs a holding operation again. In such a manner, the next holding position is determined in consideration of position information about the target object 41 inside a plastic bag, which is difficult to determine from the image information alone. The robot system can thus successfully hold the target object 41 in a shorter time, thus improving work efficiency.

FIG. 8 is a functional explanatory diagram of an information processing apparatus according to the second exemplary embodiment. A robot system 101 according to the second exemplary embodiment has a configuration in which a force sensor 5 is added to the configuration of the robot system 100 according to the first exemplary embodiment. An information processing apparatus 2001 has a hardware configuration similar to that of the information processing apparatus 20 according to the first exemplary embodiment illustrated in FIG. 2. Functional blocks of the information processing apparatus 2001 includes a force information obtaining unit 206 in addition to those in the functional blocks of the information processing apparatus 20 according to the first exemplary embodiment illustrated in FIG. 3. A holding position determination unit 2031 of the information processing apparatus 2001 has a function different from that of the holding position determination unit 203 according to the first exemplary embodiment. The force sensor 5 is connected to the information processing apparatus 2001. The rest of the configuration is the same. Differences will be described below, and a description of similar configurations and processing will be omitted.

The force sensor 5 is attached to a position at which external force acting on the holding device 3 can be measured. For example, the force sensor 5 is attached to the bottom of the holding device 3 or the end of the manipulator 1. The force sensor 5 includes a distortion gauge or a piezoelectric element, and detects force (reaction force) or moment acting on the holding device 3 when the holding device 3 is in contact with the target object 41 or a surrounding object 42. The force sensor 5 generates force information from the detection result, and transmits the force information to the information processing apparatus 2001. Examples of the force sensor 5 include a six-axis force sensor (force/torque sensor) and a three-axis force sensor. The force sensor 5 may detect force or moment by using an array of a plurality of one-dimensional pressure sensors or a plurality of contact sensors for determining the presence or absence of contact.

The force information obtaining unit 206 obtains the force information from the force sensor 5 and transmits the obtained force information to the holding position determination unit 2031. For example, the force information obtaining unit 206 includes a memory. The holding position determination unit 2031 determines a holding position based on the force information obtained from the force information obtaining unit 206 and the holding success/failure probability distribution.

FIG. 9 is a flowchart illustrating processing for controlling the robot system 101 by using the information processing apparatus 2001 having the foregoing configuration. In FIG. 9, processing similar to that of the first exemplary embodiment illustrated in FIG. 4 is designated by the same step numbers. A description of the similar processing will be omitted.

In the processing of step S8, the control unit 204 controls the manipulator 1 for a holding operation. In step S22, the force information obtaining unit 206 obtains the force information from the force sensor 5. The force information obtaining unit 206 transmits the obtained force information to the holding position determination unit 2031. This processing may be simultaneously performed while the manipulator 1 moves in the processing of step S8. For example, when the manipulator 1 moves to the holding position, the force information obtaining unit 206 constantly obtains the force information during the movement. When the value of the force information reaches a set thresholds for force or a set threshold for moment, the control unit 204 discontinues the movement of the manipulator 1. The processing then proceeds to step S9. In step S9, the holding device 3 performs a holding operation.

Figure 10A:
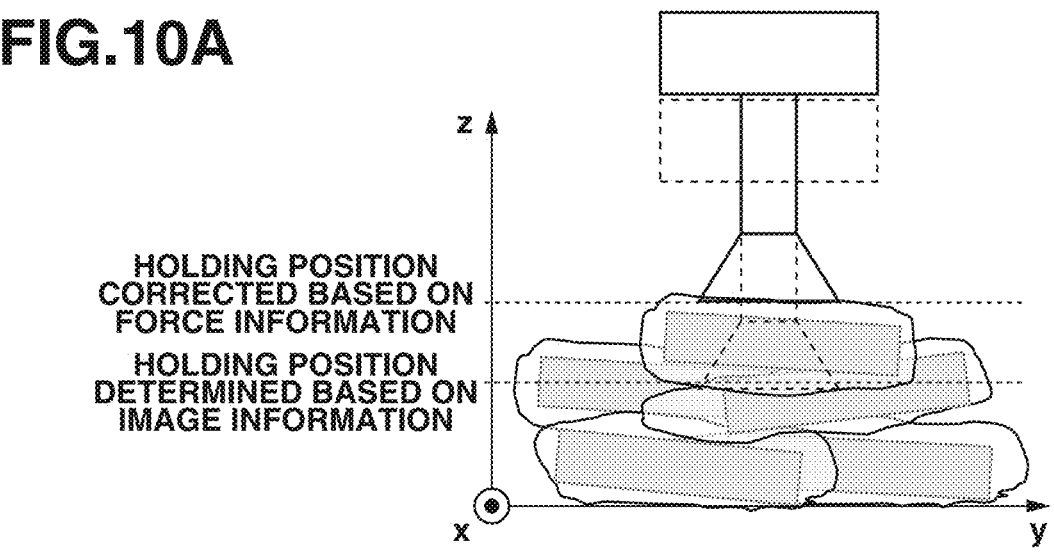
FIGS. 10A, 10B, and 10C are explanatory diagrams of a method for determining a holding position.
Figure 10B:
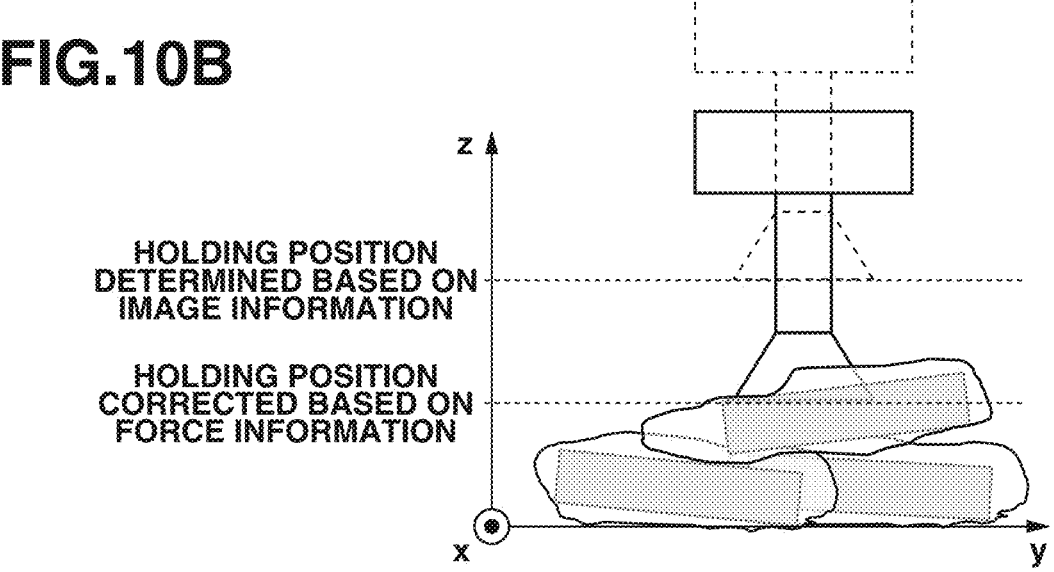
Figure 10C:
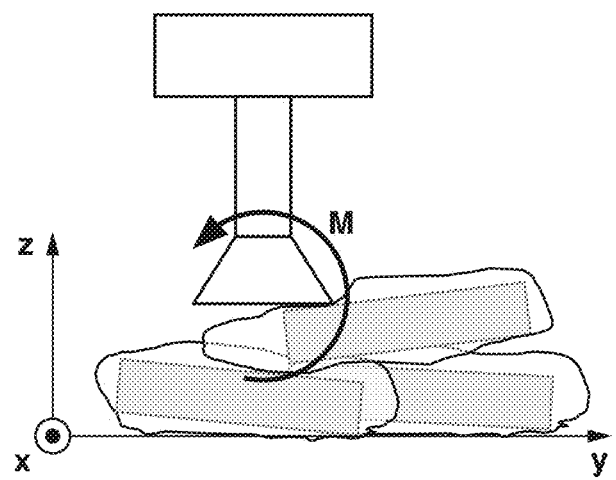

FIGS. 10A to 10C are explanatory diagrams illustrating a method for determining a holding position. As illustrated in FIG. 10A, in a case where the holding position determined from the image information is lower than the actual height of the target object 41, the holding device 3 comes into contact with the target object 41 while the manipulator 1 is still moving to the holding position. Since the target object 41 fails to be held here, the holding position is corrected based on the force information obtained from the force sensor 5.

In a case where the force information obtained after the manipulator 1 has moved to a holding position does not reach the threshold for force or the threshold for moment, the control unit 204 may continue moving the manipulator 1 before executing a holding operation. As illustrated in FIG. 10B, if the holding position determined from the image information is higher than the actual height of the target object 41, the holding device 3 can fail to contact the target object 41 even when the manipulator 1 has moved to the holding position. In such a case, the control unit 204 continues the moving operation of the manipulator 1 until the force information reaches or exceeds the threshold. A distance or time to continue the operation may be set in advance. The moving operation of the manipulator 1 may be continued until the force information reaches or exceeds the threshold.

Processing for determining a holding position (step S21) will be described. The holding position determination unit 2031 determines the holding position based on the force information and the holding success/failure probability distribution. When the holding position determination unit 2031 determines a holding position for the first time, the holding device 3 is not in contact with the target object 41 or a surrounding object 42, and no force information is obtained. The holding position determination unit 2031 then determines the holding position for the first attempt based only on the holding success/failure probability distribution. For the second and subsequent attempts, the holding position is determined, for example, by using the force information obtained in the processing of step S22. If the force information indicates rotation moment in a +x direction as illustrated in FIG. 10C, the holding position determination unit 2031 estimates that the probability of succeeding in holding is high at a position translated in a +y direction from the current holding position. The reason is that if rotation moment in the +x direction acts on holding device 3 when the holding device 3 comes into contact with the target object 41, then the target object 41 is estimated to lie in the +y direction. In such a manner, the holding position determination unit 2031 estimates a position where the holding is considered likely to succeed from the force information, and determines the next holding position in combination with the holding success/failure probability distribution.

For example, if holding success probabilities in the holding success/failure probability distribution do not vary in either of the +y and −y directions with respect to the current holding position and the target object 41 is estimated likely to be in the +y direction based on the force information, the holding position is determined with higher priority given to the +y direction. Two contradictory estimations can sometimes be made. For example, holding success probabilities can be determined to be higher in the −y direction than in the +y direction based on the holding success/failure probability distribution, while higher in the +y direction based on the force information. In such a case, the holding position determination unit 2031 determines the holding position by assigning weights to the two estimation results in advance.

In a case where, for example, that the obtained force information indicates moment, the holding position determination unit 2031 may set a threshold in advance, and if the moment is greater than or equal to the threshold, give priority to the force information over the holding success/failure probability distribution. The holding position determination unit 2031 may directly use the value of the holding success/failure probability distribution and the value of the force information as estimation inputs without using weights. In such a case, the holding position determination unit 2031 trains the learning model with the value of the holding success/failure probability distribution and the value of the force information as the inputs and a holding success/failure determination result as the output, and determines the holding position by using the learning model.

As described above, in the robot system 101 according to the present exemplary embodiment, the information processing apparatus 2001 generates a holding success/failure probability distribution based on an image (image information) captured by the imaging device 2. The holding success/failure probability distribution determination unit 202 of the information processing apparatus 2001 determines the holding success/failure probability distribution whether holding succeeds or fails from the image information. The holding position determination unit 2031 of the information processing apparatus 2001 determines a holding position for a target object 41 based on the determined holding success/failure probability distribution. The control unit 204 of the information processing apparatus 2001 controls the operation of the robot 10 based on the determined holding position, and causes the robot 10 to perform an operation for holding the target object 41. Here, the force sensor 5 generates force information based on the force or moment acting on the holding device 3. The information processing apparatus 2001 obtains the force information from the force sensor 5, and uses the force information in correcting the holding position if the target object 41 fails to be held. The holding success/failure determination unit 205 of the information processing apparatus 2001 determines whether the holding operation of the robot 10 succeeds or fails. If the holding operation fails, the holding position determination unit 2031 determines the next holding position different from the previous one(s) based on the force information and the holding success/failure probability distribution. The information processing apparatus 2001 repeatedly updates the holding position and causes the robot 10 to perform the holding operation until the target object 41 is held.

The information processing apparatus 2001 can obtain position information inside a plastic bag or cushioning material by also using the force sensor 5. The information processing apparatus 2001 can thus estimate the position of the target object 41 in the plastic bag or cushioning material and determine the holding position. Such control enables determination of the position information about the target object 41, regardless of whether the target object 41 is wrapped in a plastic bag or cushioning material, which can render the position and orientation of the target object 41 difficult to be accurately recognized from the image information and may cause holding device 3 to fail to hold the target object 41. Since the robot system 101 can estimate even which position the target object 41 is located at in the plastic bag or cushioning material and determine the holding position, the target objects 41 can be held in a short time, thus improving work efficiency.

The robot system 101 may include a proximity sensor for detecting a proximity distance between an object and the holding device 3, instead of the force sensor 5. If the force sensor 5 is used, the position of the target object 41 is detected with contact. If the proximity sensor is used, the normal to the surface of the target object 41 is detected. The proximity sensor generates proximity information indicating a proximity distance between the target object 41 and the holding device 3, and transmits the proximity information to the information processing apparatus 2001. The proximity sensor is able to accurately detect the normal to the surface of the target object 41, which is difficult to be detected based only on the image captured by the imaging device 2. A plurality of proximity sensors may be used. The information processing apparatus 2001 obtains the proximity information by using a proximity information obtaining unit, and uses the proximity information in correcting the holding position if the target object 41 fails to be held. If the target object 41 fails to be held, the holding position determination unit 2031 determines the next holding position different from the previous one(s) based on the proximity information and the holding success/failure probability distribution.

Since the normal to the surface of the target object 41 is detected, the holding device 3 can approach the target object 41 in the normal direction. This enables the holding device 3 to approach the target object 41 in a manner such that air leakage decreases if the holding device 3 includes a suction pad, for example. This improves the probability of succeeding in holding. The information processing apparatus 2001 obtains information about the position of the target object 41 and the normal direction to the surface of the target object 41 from the detection result of the proximity sensor, and determines the holding position based on the information and the holding success/failure probability distribution.

A third exemplary embodiment of the present disclosure will be described below. Compared to the robot system 100 according to the first exemplary embodiment, a robot system according to the present exemplary embodiment is configured to determine a holding position for a target object 41 in consideration of a system constraint condition as well. Specifically, as in the first exemplary embodiment, the robot system according to the third exemplary embodiment determines the holding success/failure probability distribution for the target object 41 based on the visual information (image information) about the target object 41, obtained through image capturing with a visual sensor. Next, the robot system determines a holding position in consideration of the holding success/failure probability distribution and a system constraint condition, and performs a holding operation. A "system constraint condition" refers to a constraint condition having priority during operation of the robot 10. Examples of the system constraint condition include that priority be given to prevention of a minor system stoppage and that priority be given to reduction of system cycle time.

A minor stoppage refers to a short-time system stoppage. A minor stoppage is not a critical fault but a phenomenon that needs manual operations to restart the system and temporarily stops the production line. Parameters for preventing a minor stoppage include a low probability of interference of the robot 10 with the surrounding objects 42, and a low possibility of interference of the target object 41 with the surrounding objects 42 when the target object 41 is being held. If priority is given to the prevention of a minor stoppage, the holding position is thus determined to, for example, suppress interference of the robot 10 with the surrounding objects 42 as much as possible.

The cycle time refers to a time needed for the system to produce an article to be produced. The value of the cycle time is determined by dividing the hours of operation per day by the number of articles produced per day. Parameters for reducing the cycle time include shorter moving distance and ease of speedup. An example of the moving distance is a distance between holding positions. An example of the suitability for high speed is manipulability (index indicating how freely the position and orientation of the end of the manipulator 1 can be manipulated) determined from the joint angles of the manipulator 1. If priority is given to the reduction of the cycle time, the holding position is then determined to, for example, reduce the moving distance of the robot 10 or maintain a state facilitating speedup.

After a holding operation, the robot system makes a success/failure determination about the holding execution result. If the holding is failed, the robot system determines a holding position different from the previous one based on the holding success/failure probability distribution and the system constraint condition, and performs a holding operation again. Since the next holding position is thus determined with high priority given to the function demanded for the robot system, the work efficiency improves.

Figure 11:
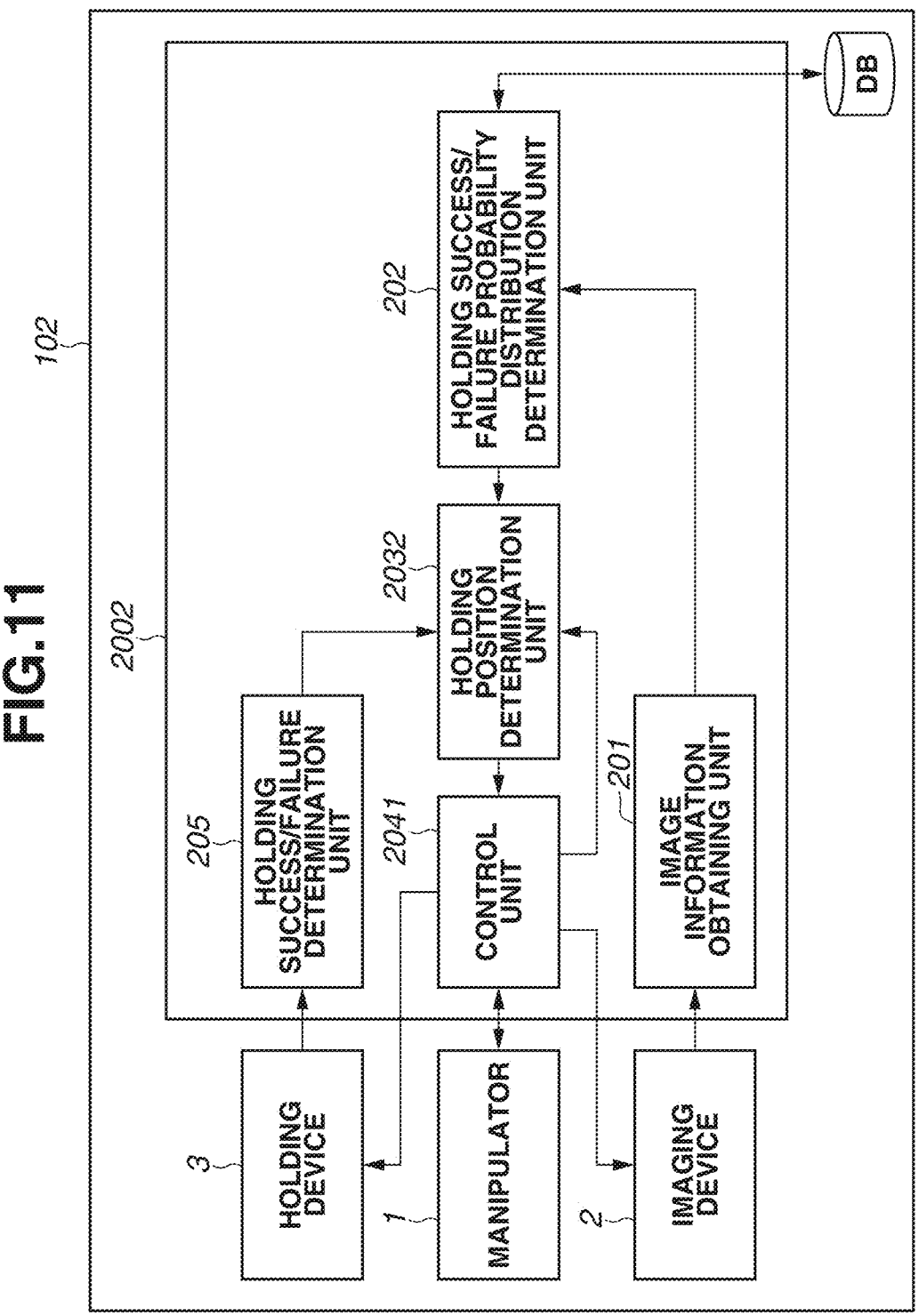
FIG. 11 is a functional explanatory diagram of an information processing apparatus.

FIG. 11 is a functional explanatory diagram of an information processing apparatus according to the third exemplary embodiment. A robot system 102 according to the third exemplary embodiment has a configuration similar to that of the robot system 100 according to the first exemplary embodiment. An information processing apparatus 2002 has a hardware configuration similar to that of the information processing apparatus 20 according to the first exemplary embodiment illustrated in FIG. 2. Functional blocks of the information processing apparatus 2002 are to those of the information processing apparatus 20 according to the first exemplary embodiment illustrated in FIG. 3. However, a holding position determination unit 2032 and a control unit 2041 have functions different from those of the holding position determination unit 203 and the control unit 204 according to the first exemplary embodiment. The control unit 2041 transmits a preset system constraint condition to the holding position determination unit 2032. The holding position determination unit 2032 determines a holding position in consideration of the system constraint condition. The rest of the configurations is the same. Differences will be described below, and a description of similar configurations and processing will be omitted.

The control unit 2041 transmits information about the system constraint condition to the holding position determination unit 2032. The holding position determination unit 2032 determines the holding position based on the holding success/failure probability distribution in consideration of the information about the system constraint condition obtained from the control unit 2041. The system constraint condition is set by the designer or operator as appropriate and stored, for example, in the RAM 23 or the external memory 24 in advance. As described above, examples of the system constraint condition include that priority be given to the prevention of a minor system stoppage and that priority be given to a shorter system cycle time.

Possible causes of a minor stoppage will be described. For example, a minor stoppage occurs if the target object 41 falls out of the box due to a movement of the box, containing the target object 41, with the robot 10 interfering with a surrounding object 42. A minor stoppage occurs if a relative positional relationship between the imaging device 2 and the holding device 3 changes and calibration needs to be performed again. The holding position therefore needs to be determined so that the robot 10 will not interfere with the surrounding objects 42. An example of a holding position at which the robot 10 is less likely to interfere with the surrounding objects 42 is a position and orientation where a sufficient motion space is provided for the manipulator 1. If, in a case where the manipulator 1 operates near the boundary of the motion space, the robot 10 makes a twisting motion, which may cause the robot 10 to move in a trajectory different from the operator's intention, the robot 10 interferes with a surrounding object 42. The control unit 2041 then transmits the joint angle information or the position and orientation information about the manipulator 1 to the holding position determination unit 2032 as the system constraint condition for preventing a minor stoppage.

Factors for reducing a cycle time include reducing the moving distance of the robot 10 and maintaining a state in which the robot 10 can operate at high speed easily. To that end, the holding position is determined so that the distance between holding positions can reduce or the manipulability of the manipulator 1 can be maintained high. To reduce the distance between holding positions, a difference from the current position and orientation information about the manipulator 1 needs to be determined. For that purpose, the control unit 2041 transmits the joint angle information or the position and orientation information about the manipulator 1 to the holding position determination unit 2032 as the system constraint condition for reducing the cycle time. To maintain high manipulability of the manipulator 1, the manipulability needs to be calculated from the joint angle information about the manipulator 1. The control unit 2041 then transmits the joint angle information about the manipulator 1 to the holding position determination unit 2032.

Figure 12:
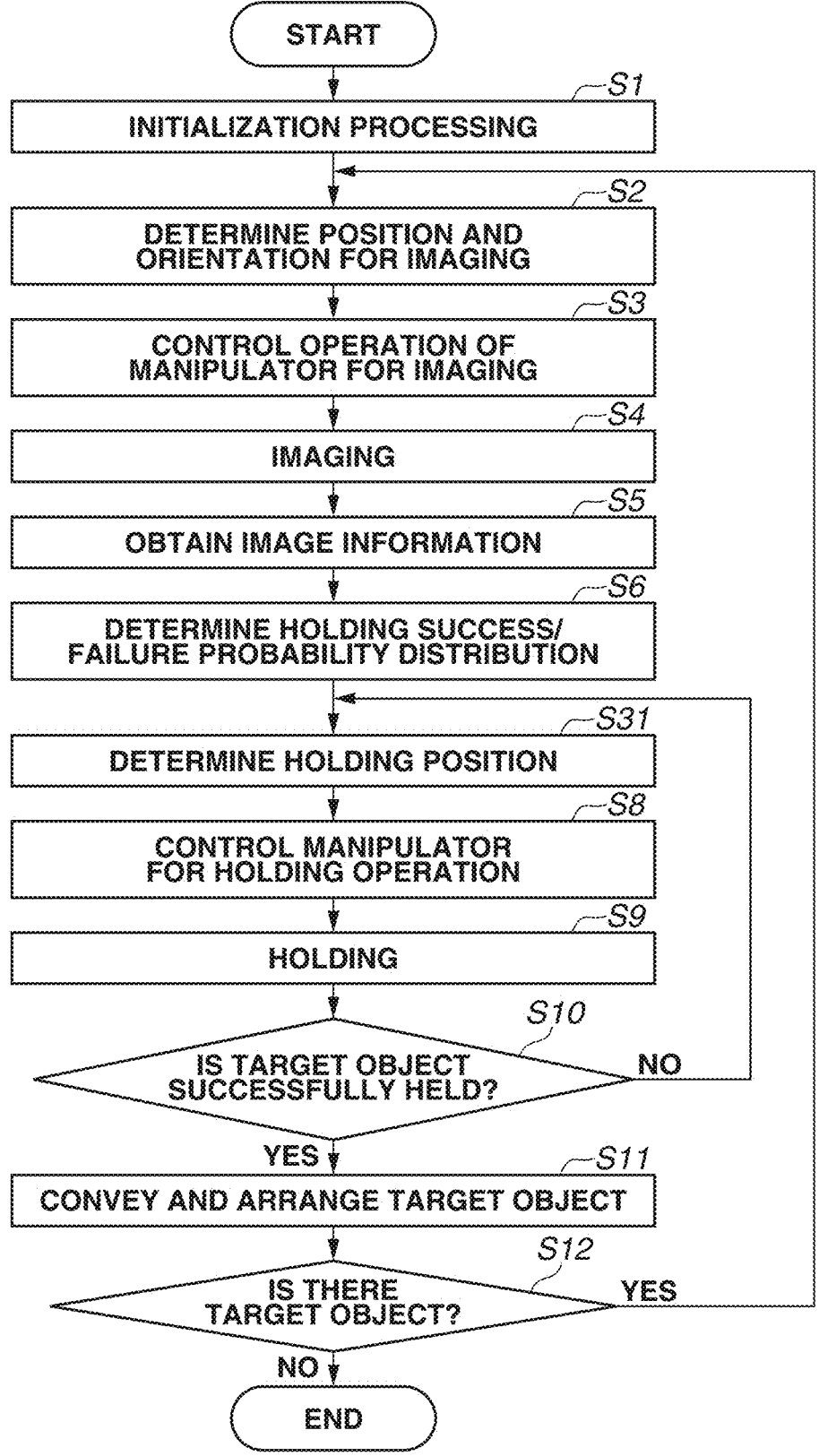
FIG. 12 is a flowchart illustrating processing for controlling a robot system.

FIG. 12 is a flowchart illustrating processing for controlling the robot system 101 to be performed by the information processing apparatus 2002 having the foregoing configuration. In FIG. 12, processing similar to that of the first exemplary embodiment illustrated in FIG. 4 is designated by the same step numbers. A description of the similar processing will be omitted.

Figure 13A:
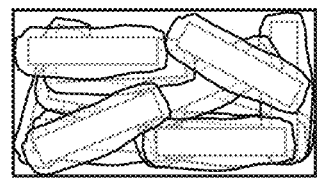
FIGS. 13A, 13B, 13C, and 13D are explanatory diagrams of a method for determining a holding position.
Figure 13B:
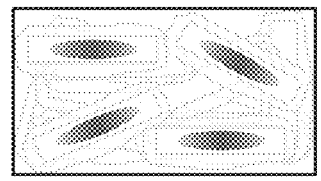

In the processing of step S6, the holding success/failure probability distribution determination unit 202 determines a holding success/failure probability distribution. In step S31, the holding position determination unit 2032 determines a holding position based on the system constraint condition and the holding success/failure probability distribution. FIGS. 13A to 13D are explanatory diagrams of a method for determining the holding position in such a case. FIG. 13A illustrates an example of an image obtained from the imaging device 2. FIG. 13B illustrates an example of a holding success/failure probability distribution obtained from the image.

Figure 13C:
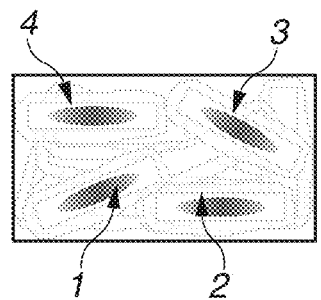

If the system constraint condition is that a minor stoppage be prevented, the likelihood of the robot 10 interfering with the box can be lowered by the holding position being set as close to the center of the box as possible. Specifically, as illustrated in FIG. 13C, positions serving as candidates for a holding position are prioritized in order of 1 to 4 from the inner side to the periphery of the box. If holding operations are executed in such order, the robot 10 performs holding operations in order from near the center of the box. The holding operations can thus be successively performed in the ascending order of likelihood of the robot 10 interfering with the box. The robot 10 is likely to interfere with the box at a position within a specific distance from a wall surface of the box, like the fourth position in the order of priority in FIG. 13C. In such a case, the position may be excluded from the order of priority.

For example, positions serving as candidates for a holding position to which the order of priority is assigned are equally treated and determined as holding position candidates if the holding success/failure probabilities at the positions exceed a predetermined threshold. The determined plurality of holding position candidates is prioritized by taking the system constraint condition into account. Alternatively, the holding position candidates may be prioritized by assigning weights to the holding success/failure probability and the system control condition. For example, the closer to the center of the box a holding position candidate is, the closer to "1" the score given to the holding position candidate is. The closer to a corner of the box, the closer to "0" the score. The scores may be linear or nonlinear. The positions may be prioritized based on the holding success/failure probabilities at the positions, multiplied by the respective scores.

In performing a holding operation again after a holding failure, consideration is given so that the holding device 3 will not interfere with the surrounding objects 42. Specifically, during a holding operation, the holding device 3 is located near the target object 41 and the surrounding objects 42. In a case where the holding is failed and the holding device 3 is to move to the next holding position, the holding device 3 can interfere with the target object 41 or the surrounding objects 42 if the holding device 3 is simply slid sideways. This can damage the target object 41 or the surrounding objects 42 or break the holding device 3. The trajectory of the robot 10 is then determined so that the robot 10 will not interfere with the target object 41 or the surrounding objects 42. For example, the trajectory is determined so that the trajectory does not interfere with the surrounding objects 42 based on the arrangement of the surrounding objects 42 which is checked in the image captured by the imaging device 2.

Consideration is given not only to the interference during a holding operation but also to the conveyance and arrangement operations of the holding device 3 after the holding operation. For example, after a holding operation, the target object 41 held by the holding device 3 can interfere with the surrounding objects 42. In such a case, the target object 41 can fall and be damaged. The trajectory of the robot 10 is then determined so that the target object 41 will not interfere with the surrounding objects 42. For example, the trajectory is determined so that the target object 41 held by the holding device 3 will not interfere with the surrounding objects 42 based on the arrangement of the surrounding objects 42 which is checked in the image captured by the imaging device 2.

Figure 13D:
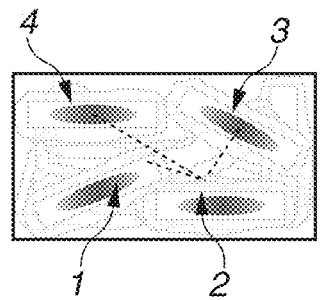

If the system constraint condition is that the cycle time be reduced, the cycle time can be reduced by the distance between the previous and current holding positions being reduced as much as possible. Take, for example, the holding success/failure probability distribution illustrated in FIG. 13B. Initially, as illustrated in FIG. 13D, a holding position candidate having the highest holding success/failure probability is determined as the first holding position. Next, the second holding position is determined in consideration of the distance from the first holding position. The reason why the second holding position is determined as illustrated in FIG. 13D is that the distance there from the first holding position is the closest among those from the first holding position to the other three holding position candidates. If there is a plurality of holding position candidates, the second holding position may be determined not only simply based on the first holding position but also by comprehensively taking into account the distances to the third, fourth, and subsequent holding position candidates. In view of a positional relationship with the other holding position candidates, the holding position candidate having the highest holding success/failure probability does not necessarily need to be determined as the first holding position.

Another example with the system constraint condition that the cycle time be reduced will be described. The cycle time can be reduced by holding positions being determined in such a manner that a state in which the robot 10 can operate at high speed easily is maintained. For example, if there is a plurality of holding position candidates at substantially the same moving distances, priority is determined by taking into account the current manipulability ellipsoid of the manipulator 1 and the position and orientation of the manipulator 1 after movement. The manipulability ellipsoid is a spatial representation of the manipulability. The manipulator 1 can operate easily at high speed in the semi-major axis of the ellipsoid while the manipulator 1 is hard to operate at high speed in the semi-minor axis. By the manipulability ellipsoid being taken into account, higher priority is given to holding position candidates lying in directions in which high speed operation is easier. By the position and orientation of the manipulator 1 after movement being taken into account, higher priority is given to holding position candidates that enable holding in a position and orientation with higher manipulability. Since holding operations can be performed at positions and orientations enabling facilitation of high speed operation of the manipulator 1 as much as possible, the cycle time can be reduced.

As described above, in the robot system 102 according to the present exemplary embodiment, the information processing apparatus 2002 generates a holding success/failure probability distribution based on an image captured by the imaging device 2. The holding success/failure probability distribution determination unit 202 of the information processing apparatus 2002 determines the holding success/failure probability distribution whether holding succeeds or failures from the image information. The holding position determination unit 2032 of the information processing apparatus 2002 determines a holding position for the target object 41 based on the determined holding success/failure probability distribution and a system constraint condition obtained from the control unit 2041. The control unit 2041 of the information processing apparatus 2002 controls the operation of the robot 10 based on the determined holding position and causes the robot 10 to perform an operation for holding the target object 41. The holding success/failure determination unit 205 of the information processing apparatus 2002 determines whether the holding operation of the robot 10 succeeds or fails. If the holding operation fails, the holding position determination unit 2032 determines a next holding position different from the previous one(s) based on the system constraint condition and the holding success/failure probability distribution. The information processing apparatus 2002 repeatedly updates the holding position and causes the robot 10 to perform a holding operation until the target object 41 is held.

The information processing apparatus 2002 can operate the robot system 102 in a manner more suited for an intended purpose by the system constraint condition such as prevention of a minor stoppage and reduction of a cycle time being taken into account. Such control enables operation suited for the intended purpose by the system constraint condition being taken into account, regardless of whether the target object 41 is wrapped in a plastic bag or cushioning material, which can render the position and orientation of the target object 41 difficult to be accurately recognized by the imaging device 2 and may cause holding device 3 to fail to hold the target object 41. The robot system 102 can thus improve work efficiency.

A fourth exemplary embodiment of the present disclosure will be described. A robot system according to the present exemplary embodiment, if holding fails, performs manipulator holding control without determining a holding position based on a holding success/failure probability distribution again. Specifically, as in the first exemplary embodiment, the robot system according to the fourth exemplary embodiment determines a holding success/failure probability distribution for a target object 41 based on visual information (image information) about the target object 41 obtained through imaging with a visual sensor. The robot system then determines a plurality of holding position candidates serving as candidates for a holding position and order of priority of the holding position candidates based on the holding success/failure probability distribution, and performs a holding operation.

If the target object 41 fails to be held, the robot system determines a next holding position based on the order of priority of the plurality of holding position candidates, and performs a holding operation again. This reduces the number of times of processing for determining a holding position, and the robot system can perform holding operations in a shorter time, thus improving work efficiency. More specifically, the processing for determining a holding position based on the holding success/failure probability distribution is performed only once. Since the processing for determining a holding position is not repeated, holding can succeed in a shorter time, thus improving work efficiency.

Figure 14:
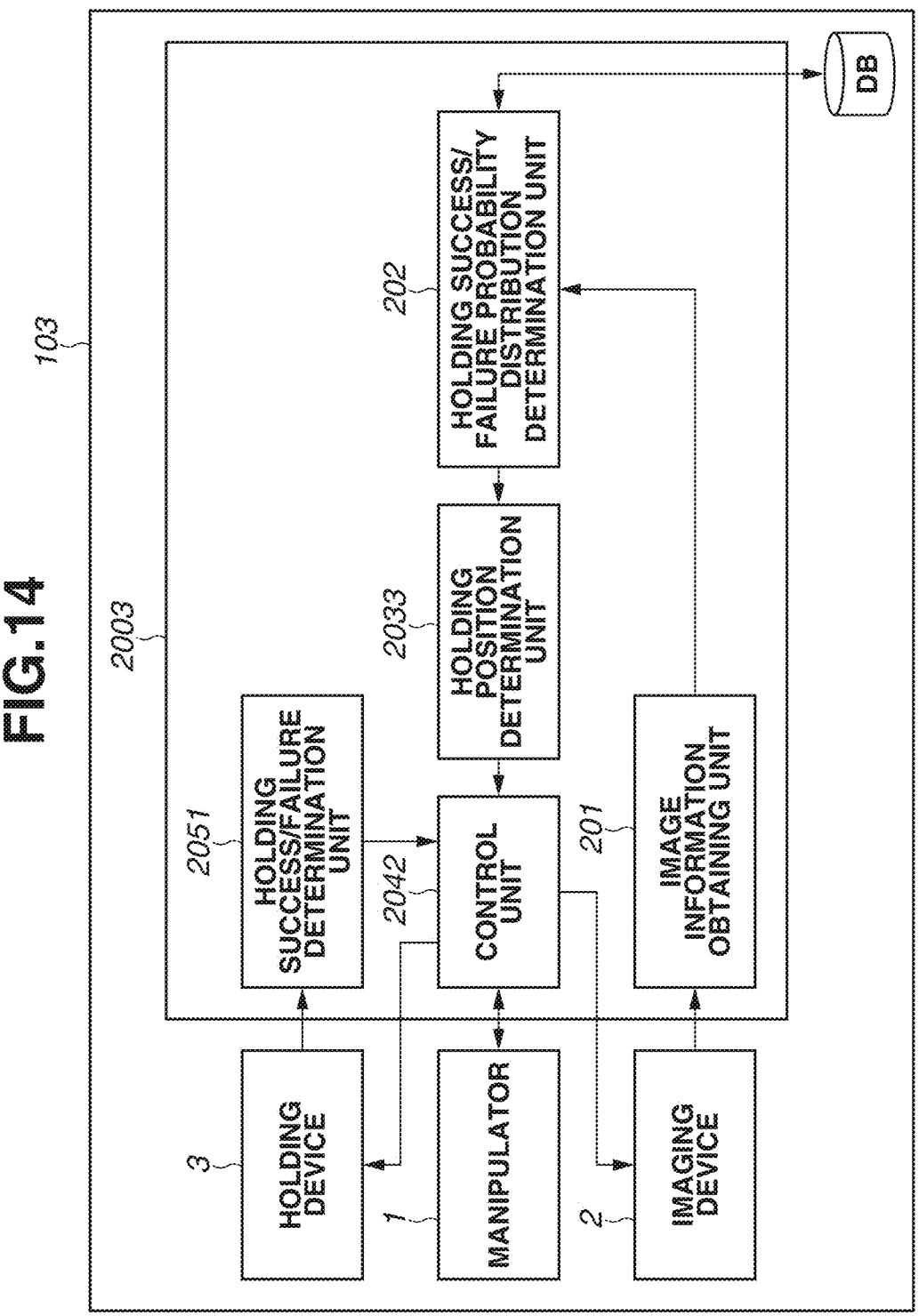
FIG. 14 is a functional explanatory diagram of an information processing apparatus.

FIG. 14 is a functional explanatory diagram of an information processing apparatus according to the fourth exemplary embodiment. A robot system 103 according to the fourth exemplar) embodiment has a configuration similar to that of the robot system 100 according to the first exemplary embodiment. An information processing apparatus 2003 has a hardware configuration similar to that of the information processing apparatus 20 according to the first exemplary embodiment illustrated in FIG. 2. Functional blocks of the information processing apparatus 2003 are similar to those of the information processing apparatus 20 according to the first exemplary embodiment illustrated in FIG. 3. However, a holding position determination unit 2033, a control unit 2042, and a holding success/failure determination unit 2051 have functions different from those in the first exemplary embodiment.

The holding position determination unit 2033 determines a plurality of holding position candidates and the order of priority thereof based on the holding success/failure probability distribution determined by the holding success/failure probability distribution determination unit 202. The holding position determination unit 2033 transmits the determined plurality of holding position candidates and the order of priority to the control unit 2042.

When the holding device 3 holds the target object 41, the holding success/failure determination unit 2051 determines whether the holding succeeds or fails. The determination method is the same as that described in the first exemplary embodiment. The holding success/failure determination unit 2051 transmits the determination result to the control unit 2042.

During imaging, the control unit 2042 controls the position and orientation of the manipulator 1, and, in response to the imaging device 2 moving, the control unit 2042 transmits an imaging trigger to the imaging device 2. During holding, the control unit 2042 performs control to move the manipulator 1 to a holding position and orientation, and, in response to the holding device 3 moving, the control unit 2042 transmits a holding trigger to the holding device 3. The control unit 2042 obtains a holding position candidate for determining the holding position and orientation of the manipulator 1 from the holding position determination unit 2033. If there is a plurality of holding position candidates, the control unit 2042 obtains the plurality of holding position candidates and the order of priority thereof. If the control unit 2042 obtains information indicating a holding failure from the holding success/failure determination unit 2051, the control unit 2042 performs manipulator holding control to perform a holding operation again at a holding position based on the order of priority of the holding position candidates obtained from the holding position determination unit 2033.

Figure 15:
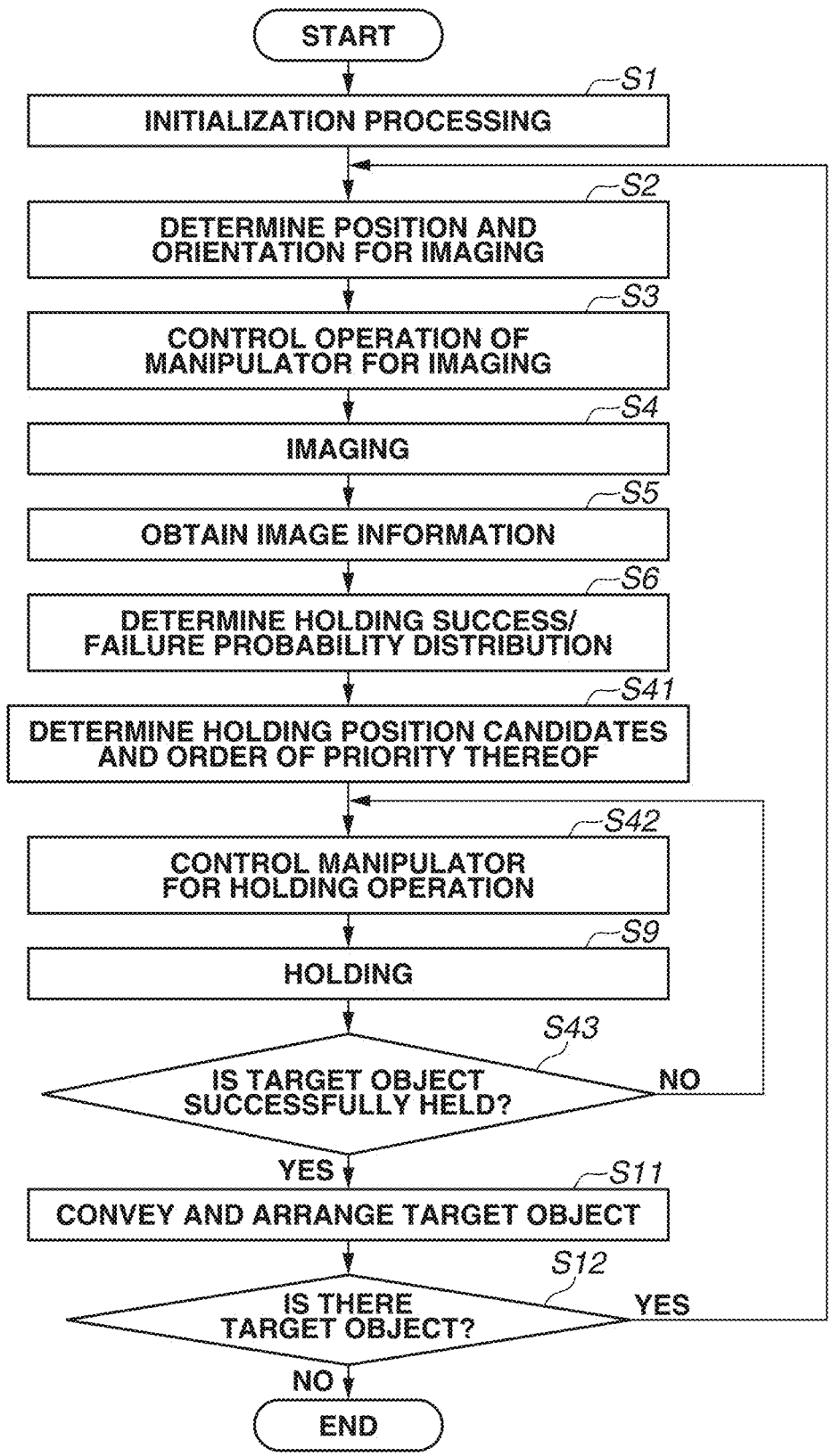
FIG. 15 is a flowchart illustrating processing for controlling a robot system.

FIG. 15 is a flowchart illustrating processing for controlling the robot system 103 to be performed by the information processing apparatus 2003 having the foregoing configuration. In FIG. 15, processing similar to that of the first exemplary embodiment illustrated in FIG. 4 is designated by the same step numbers. A description of the similar processing will be omitted.

In the processing of step S6, the holding success/failure possibility distribution determination unit 202 determines the holding success/failure probability distribution. In step S41, the holding position determination unit 2032 determines a plurality of holding position candidates and the order of priority thereof based on the holding success/failure possibility distribution. The holding position determination unit 2032 transmits the determined plurality of holding position candidates and the order of priority to the control unit 2042.

The plurality of holding position candidates is determined, for example, by positions of high possibilities being extracted from the holding success/failure probability distribution and clustering the extracted positions to determine a predetermined number of candidate ranges, and assuming the centers of the candidate ranges as holding position candidates. If a suction pad is used for the holding device 3, the range of clustering can be set to the diameter of the suction pad. The order of priority of the plurality of holding position candidates can be determined from the number of positions where the holding success/failure probability distribution has a probability higher than or equal to a predetermined threshold or from the maximum probability value of the holding success/failure probability distribution in each of the candidate ranges.

The plurality of holding position candidates may be determined by initially determining a holding position candidate and then determining the other holding position candidates so that holding is performed around by predetermined movements with respect to the holding position candidate. For example, positions at intervals of $\theta$ in angle on a circumference having a radius of r about the initially-determined holding position candidate are determined as holding position candidates. The periphery of the initially-determined holding position candidate may be determined as holding position candidates based on the shape of the range where the holding success/failure probabilities are high. For example, if there is an elliptical range where the holding success/failure probabilities are high around the initial holding position candidate, holding position candidates are determined from within the elliptical range. Holding position candidates other than the initial holding position candidates may be determined by only the distance to the target object 41 (in the case of a planar arrangement, height) being changed.

In step S42, the control unit 2042 controls the operation of the manipulator 1 for a holding operation. Specifically, the control unit 2042 determines how to move the manipulator 1 based on a position and orientation or trajectory determined by the holding position determination unit 2033, and operates the manipulator 1.

In step S43, the holding success/failure determination unit 2051 determines whether the holding device 3 succeeds or fails in holding the target object 41. The method of the holding success/failure determination is the same as in the first exemplary embodiment. If the holding success/failure determination unit 2051 determines that the target object 41 is successfully held (YES in step S43), the processing proceeds to step S11. The information processing apparatus 2003 then performs the processing of step S11 and subsequent steps. If the holding success/failure determination unit 2051 determines that the target object 41 fails to be held (NO in step S43), the processing proceeds to step S42. Here, the holding success/failure determination unit 2051 transmits information indicating the holding failure to the control unit 2042. To perform a holding operation again, the control unit 2042 obtaining the information indicating the holding failure determines a holding position among the plurality of holding position candidates determined by the holding position determination unit 2033 based on the order of priority. In step S42, the control unit 2042 performs control to cause the manipulator 1 to perform a holding operation at the holding position.

As described above, in the robot system 103 according to the present exemplary embodiment, the information processing apparatus 2003 generates a holding success/failure probability distribution based on an image captured by the imaging device 2. The holding success/failure probability distribution determination unit 202 of the information processing apparatus 2003 determines a distribution of holding success/failure probabilities indicating whether holding succeeds or fails from the image information. The holding position determination unit 2032 of the information processing apparatus 2003 determines a plurality of holding position candidates for the target object 41 and the order of priority of the holding position candidates based on the determined holding success/failure probability distribution. The control unit 2041 of the information processing apparatus 2003 controls the operation of the robot 10 based on the holding position determined among the holding position candidates, and cause the robot 10 to perform an operation for holding the target object 41. The holding success/failure determination unit 205 of the information processing apparatus 2003 determines whether the holding operation of the robot 10 succeeds or fails. If the holding operation fails, the control unit 2042 determines a next holding position different from the previous one(s) from among the holding position candidates based on the order of priority. The information processing apparatus 2003 repeatedly updates the holding position and cause the robot 10 to perform a holding operation until the target object 41 is held.

The information processing apparatus 2003 determines the plurality of holding position candidates and the order of priority of the holding position candidates at a time based on the holding success/failure probability distribution. Such control reduces the number of times of the determination processing, and enables holding of the target object 41 in a short time. The robot system 103 can thus improve work efficiency.

In the foregoing first to fourth exemplary embodiments, the reliability of the distance image may be used as information for determining a holding position. Suppose that a target object 41 is wrapped in a plastic bag or cushioning material, and an accurate distance image thereof is difficult to be obtained. Determining a holding position for such a target object 41 based on the reliability of the distance image can make an approach to the target object 41 more likely to succeed. This enables successful holding in a short time, thus improving work efficiency. In the first to fourth exemplary embodiments, examples of the target object 41 may include objects of which accurate holding positions are difficult to be estimated due to deformation or light reflection, soft objects such as a power cable, and metal and semitransparent objects.

An exemplary embodiment of the present disclosure can be implemented by processing for supplying a program for implementing one or more functions of the foregoing exemplary embodiments to a system or an apparatus via a network or a storage medium, and reading and executing the program by one or more processors of a computer of the system or apparatus. A circuit implementing one or more functions (for example, an application specific integrated circuit (ASIC)) can be used for implementation.

According to an exemplary embodiment of the present disclosure, holding of a target object by a robot can be performed in a shorter time for improved work efficiency.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-087447, filed Apr. 27, 2018, which is hereby incorporated by reference herein in its entirety.

What is claimed is:

1. An information processing apparatus comprising:
one or more processors, wherein the one or more processors function as:

an estimation unit configured to estimate a holding success possibility from an image of a plurality of target objects by using a pre-trained model that estimates the holding success possibility in at least one or more positions;

a determination unit configured to determine position satisfying a predetermined condition in a holding range in which an end effector of a robot acts on a target object, of the plurality of target objects, as a holding position for holding the target object, sequentially from among the at least one or more positions, based on the holding success possibility; and a control unit configured to move the robot based on the holding position determined by the determination unit and cause the robot to perform a holding operation on the target object, wherein the determination unit is configured to, in a case where the holding operation performed on the target object by the robot is failed, determine a next holding position from a peripheral range of the holding position in the holding range in the holding operation in a case where there is a position other than the holding position satisfying the predetermined condition in the holding range, and determine the next holding position from positions outside the holding range satisfying the predetermined condition in a case where there is not a position satisfying the predetermined condition in the holding range, based on the holding success possibility.

2. The information processing apparatus according to claim 1, wherein the robot is configured to perform the holding operation by suction of the target object, and wherein the determination unit is configured to, in a case where the robot fails to suction the target object, determine position satisfying the predetermined condition as the next holding position based on the holding success possibility.

3. The information processing apparatus according to claim 1, wherein the pre-trained model is a neural network into which an image of the plurality of the target objects is input and is trained to output image information about the image, the image information indicating at least one or more positions as a holding position(s).

4. The information processing apparatus according to claim 3, wherein the pre-trained model is a neural network trained with training data obtained by a person giving a true value to a captured image of a group of the target objects disorderly arranged, the true value indicating a position where the target object is successfully held.

5. The information processing apparatus according to claim 4, wherein the determination unit is configured to prevent a predetermined position from being determined as the holding position even in a case where a holding success probability based on the holding success possibility is higher than a predetermined threshold, the predetermined region being set based on a shape of a container containing the target object.

6. The information processing apparatus according to claim 1, wherein the predetermined condition is that a holding success probability based on the information indicating the holding success possibility be higher than a predetermined threshold.

7. The information processing apparatus according to claim 1, wherein the determination unit is configured to determine a plurality of the holding positions based on the holding success possibility, and wherein the predetermined condition is that a position to be determined as the next holding position be different from the previous holding positions determined by the determination unit.

8. The information processing apparatus according to claim 1, further comprising an obtaining unit configured to obtain force information indicating external force acting when the robot makes contact with the target object, wherein the control unit is configured to continue moving the robot until the force information satisfies a second predetermined condition.

9. The information processing apparatus according to claim 1, further comprising an obtaining unit configured to obtain proximity information indicating a proximity distance between the robot and the target object, wherein the control unit is configured to perform control to cause the robot to approach the target object in a normal direction based on the proximity information.

10. The information processing apparatus according to claim 1, wherein the determination unit is configured to determine an order of priority of a plurality of positions to be candidates for the holding position based on the holding success possibility, and wherein the determination unit is configured to, in a case where the holding operation performed on the target object by the robot is failed, determine the holding position based on the order of priority.

11. The information processing apparatus according to claim 10, wherein the determination unit is configured to determine the order of priority in such a manner that the order of priority decreases toward a corner of a container containing the target object.

12. The information processing apparatus according to claim 1, wherein the robot includes a suction device configured to suction the target object, and wherein the information processing apparatus further comprises a second determination unit configured to, when the robot performs the holding operation, determine whether the robot succeeds or fails in holding the target object based on a measurement result obtained by a degree of vacuum in a space formed between the robot and the target object being measured.

13. The information processing apparatus according to claim 12, wherein the second determination unit is configured to, in a case where the measurement result of the suction device reaches a predetermined value, determine that the holding is successful, and in a case where the measurement result does not reach the predetermined value, determine that the holding is failed.

14. The information processing apparatus according to claim 1, further comprising a storage unit configured to, in a case where it is determined that the holding of the target object performed by the robot is failed, store the holding position at that time, wherein the determination unit is configured not to determine the previous holding position(s) determined by the determination unit as a new holding position before a state of the target object changes.

15. The information processing apparatus according to claim 1, wherein the image includes distance information between the target object and an imaging device.

16. The information processing apparatus according to claim 1, wherein the robot includes an imaging device configured to capture the target object and a surrounding object, and wherein the control unit is configured to control movement of an arm of the robot.

17. The information processing apparatus according to claim 16, wherein the control unit is configured to control the robot in such a manner that a moving distance to the holding position determined by the determination unit is shortened and that the robot takes a trajectory that maximizes a moving speed of the robot.

18. The information processing apparatus according to claim 1, wherein the information indicating the holding success possibility includes a distribution indicating a probability of succeeding in holding the target object with respect to each pixel of the image.

19. The information processing apparatus according to claim 1, wherein, in a case where the holding operation performed on the target object by the robot is failed, the determination unit determines the next holding position from among positions at which the holding success possibility satisfies the predetermined condition such that a moving distance of the end effector is shortened, based on the holding success possibility.

20. The information processing apparatus according to claim 1, wherein, in a case where the holding operation performed on the target object by the robot is failed, the determination unit determines the next holding position from among positions at which the holding success possibility satisfies the predetermined condition based on the holding success possibility and a manipulability ellipsoid of the end effector.

21. An information processing method comprising:
estimating a holding success possibility from an image of a plurality of target objects by using a pre-trained model that estimates the holding success possibility in at least one or more positions;
determining a position satisfying a predetermined condition in a holding range in which an end effector of a robot acts on the target object as a holding position for holding a target object, of the plurality of target objects, sequentially from among the at least one or more positions, based on the holding success possibility;
moving the robot based on the holding position determined by the determining and causing the robot to perform a holding operation on the target object; and
in a case where the holding operation performed on the target object by the robot is failed, determining a next holding position from a peripheral range of the holding position in the holding range in the holding operation in a case where there is a position other than the holding position satisfying the predetermined condition in the holding range, and determining the next holding position from positions outside the holding range satisfying the predetermined condition in a case where there is not a position satisfying the predetermined condition in the holding range, based on the holding success possibility.

22. A non-transitory storage medium storing a program for causing a computer to perform an information processing method comprising:
estimating a holding success possibility from an image of a plurality of target objects by using a pre-trained model that estimates the holding success possibility in at least one or more positions;
determining a position satisfying a predetermined condition in a holding range in which an end effector of a robot acts on a target object, of the plurality of target objects, as a holding position for holding the target object, sequentially from among the at least one or more positions, based on the holding success possibility;
moving the robot based on the holding position determined by the determining and causing the robot to perform a holding operation on the target object; and
in a case where the holding operation performed on the target object by the robot is failed, determining a next holding position from a peripheral range of the holding position in the holding range in the holding operation in a case where there is a position other than the holding position satisfying the predetermined condition in the holding range, and determining the next holding position from positions outside the holding range satisfying the predetermined condition in a case where there is not a position satisfying the predetermined condition in the holding range, based on the holding success possibility.

* * * * *